United States Patent
Grani et al.

(10) Patent No.: US 10,557,716 B2
(45) Date of Patent: Feb. 11, 2020

(54) AUDIBLE ROUTE SEQUENCE FOR NAVIGATION GUIDANCE

(71) Applicant: HERE Global B.V., Eindhoven (NL)

(72) Inventors: Francesco Grani, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 10 days.

(21) Appl. No.: 16/007,543

(22) Filed: Jun. 13, 2018

(65) Prior Publication Data

US 2019/0383634 A1    Dec. 19, 2019

(51) Int. Cl.
*G01C 21/36* (2006.01)
*G01C 21/20* (2006.01)

(52) U.S. Cl.
CPC ....... *G01C 21/3629* (2013.01); *G01C 21/206* (2013.01)

(58) Field of Classification Search
CPC ................................................ G01C 21/3629
See application file for complete search history.

(56) References Cited

U.S. PATENT DOCUMENTS

| | | | |
|---|---|---|---|
| 8,538,687 | B2 | 9/2013 | Plocher et al. |
| 9,140,554 | B2 | 9/2015 | Jerauld |
| 9,612,722 | B2 | 4/2017 | Miller et al. |
| 2011/0164768 | A1 * | 7/2011 | Huseth ............ H04S 7/304 381/300 |
| 2011/0276264 | A1 | 11/2011 | Plocher et al. |
| 2014/0107916 | A1 | 4/2014 | Urup et al. |

(Continued)

FOREIGN PATENT DOCUMENTS

| | | |
|---|---|---|
| DE | 102009059821 | 6/2011 |
| EP | 2842529 A1 | 3/2015 |

(Continued)

OTHER PUBLICATIONS

Blair, Wilfred, "3 Sound Navigation", European Satellite Navigation Competition Sep. 25-26, 2012, 20 pages, Anwendungszentrum GmbH, retrieved from <http://slideplayer.com/slide/7446332/#> on Sep. 29, 2018.

(Continued)

*Primary Examiner* — Todd M Melton
(74) *Attorney, Agent, or Firm* — Alston & Bird LLP

(57) ABSTRACT

Various embodiments of the present invention relate to providing an audible route sequence for guiding a user along a route. A user apparatus determines a user location, distance and directional aspects for one or more waypoint of the route, and a cadence. A distance aspect of a waypoint is a distance between the waypoint and the user location. A directional aspect of a waypoint is the angle between a reference heading and straight line connecting the waypoint to the user location. The cadence is determined based on the distance between consecutive waypoints. The user apparatus determines a route sequence based on the distance and directional aspects for the waypoints and the cadence. The route sequence comprises a sequence of audible pitches that each correspond to a waypoint of the route. The user apparatus causes the route sequence to by audibly provided via a sound device.

20 Claims, 7 Drawing Sheets

(56) References Cited

U.S. PATENT DOCUMENTS

2017/0318407 A1 11/2017 Meister et al.
2018/0073886 A1 3/2018 Ilse et al.

FOREIGN PATENT DOCUMENTS

FR 3038101 A1 12/2016
JP H07103781 4/1995

OTHER PUBLICATIONS

Polojärvi, Mikko, et al., "Navigating by audio-based probing and fuzzy routing", Academic Mind Trek'13, Oct. 1-4, 2013, pp. 87-94, Tampere, Finland, retrieved from <http://ubicomp.oulu.fi/files/mindtrek13b.pdf> on Sep. 29, 2018.

Holland, Simon, et al., "Audio GPS: spatial audio in a minimal attention interface", Journal Personal and Ubiquitous Computing, Sep. 2002, pp. 253-259, vol. 6, No. 4, retrieved from <https://pdfs.semanticscholar.org/a4fa/d2d3819160eflfe4e15677c54b9c968d8952.pdf> on Sep. 29, 2018.

European Patent Office, Extended European Search Report for European Patent Application No. 19179222.5, dated Nov. 4, 2019, (8 pages), Munich, Germany.

\* cited by examiner

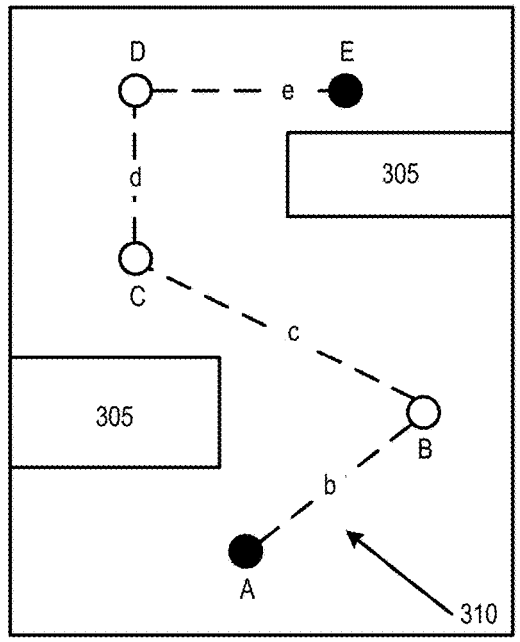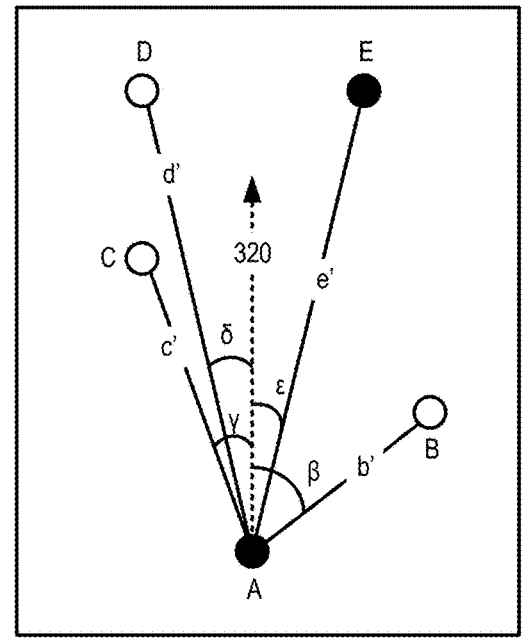
FIG. 3A    FIG. 3B
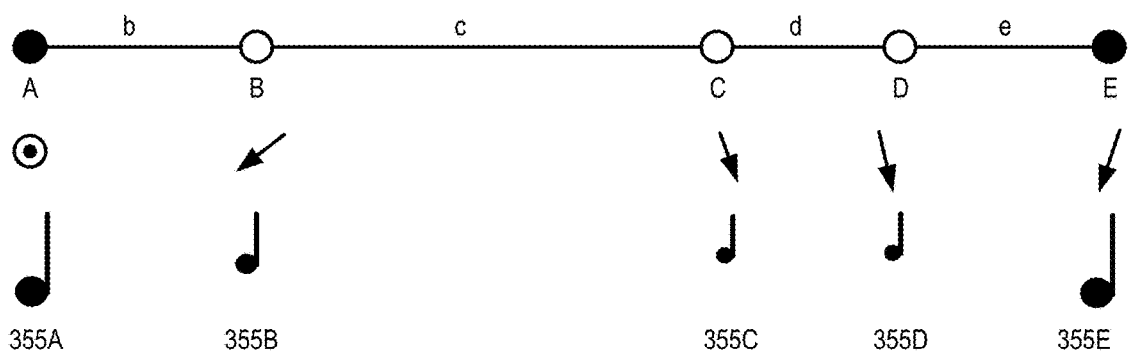
FIG. 3C
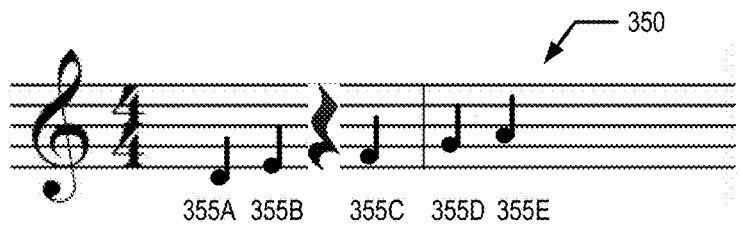
FIG. 3D

FIG. 5A  FIG. 5B

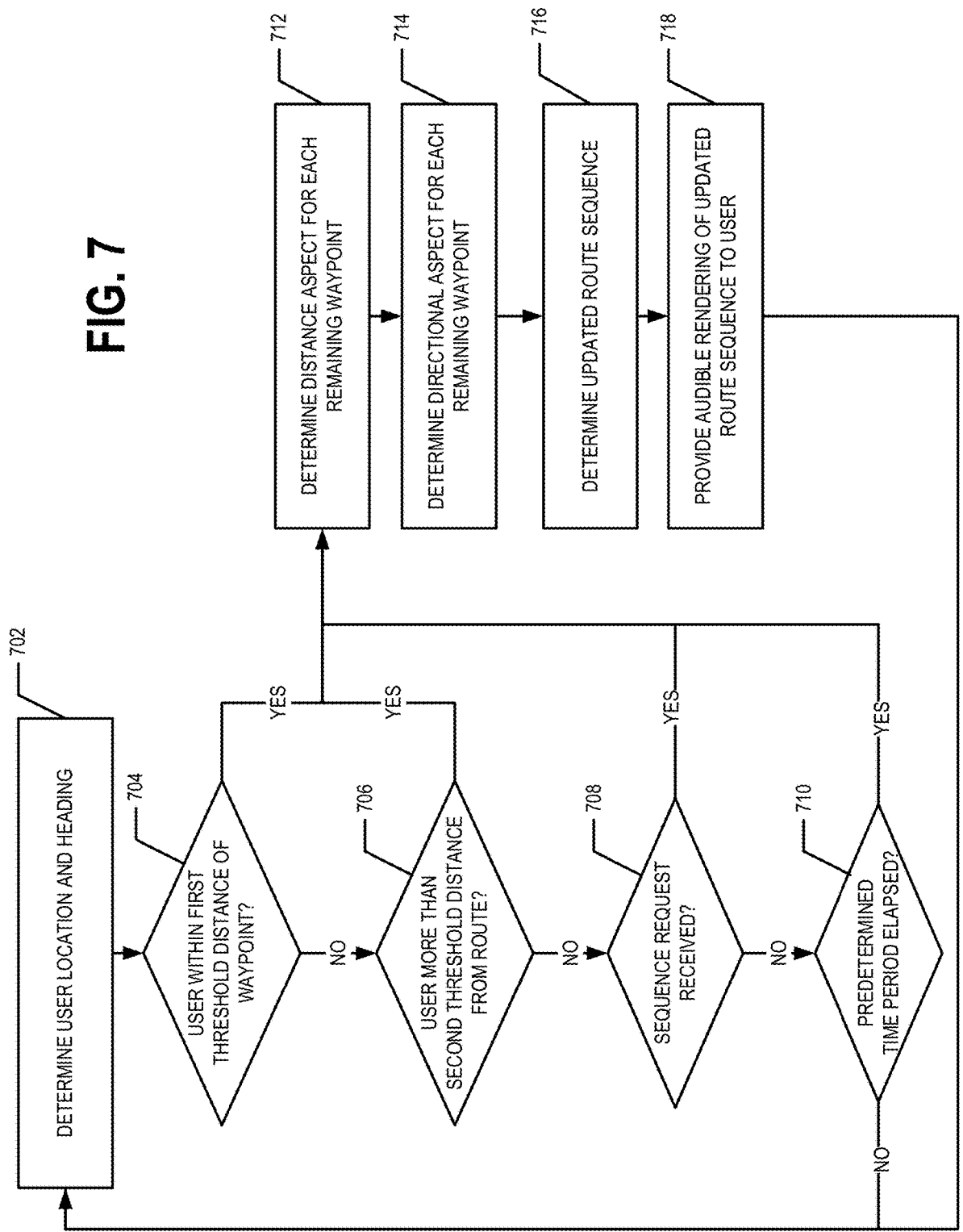

AUDIBLE ROUTE SEQUENCE FOR NAVIGATION GUIDANCE

TECHNOLOGICAL FIELD

An example embodiment relates generally to audible navigation guidance. An example embodiment relates generally to audible and/or harmonic sequences for navigating in an indoor space.

BACKGROUND

Voice instructions in the field of navigation are widespread. In typical cases, like when driving a car, voice navigational cues work very well, but still they require the user to listen to complete sentences and translate the meaning in terms of language and signage. This can be quite inefficient for example in cases like a pedestrian walking short distances in an indoor space, where the duration of spoken instructions might already be too lengthy in comparison to the distance to be walked before the next maneuver point.

BRIEF SUMMARY OF SOME EXAMPLE EMBODIMENTS

Various embodiments provide a technical solution to the technical problem of providing navigational guidance. For example, various embodiments relate to providing navigational guidance within a space, such as an indoor space (e.g., a shopping mall, stadium or arena, and/or the like) and/or outdoor space (e.g., fair grounds, a festival, amusement park, public park, and/or the like). In various embodiments, the navigation guidance is provided via an audible route sequence. In various embodiments, the audible route sequence is a harmonic sequence within a three dimensional (3D) sound space. For example, the route sequence may comprise a series of harmonic notes or pitches with each note or pitch representing a waypoint of a route represented by the route sequence. Each note or pitch may be conditioned to sound as if the note or pitch is originating at the corresponding waypoint. For example, a note or pitch corresponding to a first waypoint of a route represented by the route sequence may have an aural position corresponding to the relative direction of the waypoint with respect to a reference heading corresponding to the user and a distance between the waypoint and the user location (e.g., the user location as determined by the user apparatus via one or more location sensors). In an example embodiment, the reference heading corresponding to the user is the user heading (e.g., the direction the user is facing or the direction the user is moving in as determined by the user apparatus via one or more sensors). In an example embodiment, the cadence of the route sequence indicates the distance between waypoints of the route represented by the route sequence. Thus, in various embodiments, the route sequence provides an audible and/or harmonic representation of the route that provides the user with directional and distance guidance from the user's location to a destination. In an example embodiment, the user may wear a personal sound device(s) (e.g., headphones, earbuds, hearing aids, bone conducting device, and/or the like) and the route sequence may be provided (e.g., audibly) via the personal sound device(s).

In an example embodiment, a route sequence may be audibly provided to a user (e.g., via one or more sound devices) to guide the user along a route to a destination. A user location is determined by a user apparatus and via one or more location sensors. A distance aspect for one or more waypoints is determined by the user apparatus. The one or more waypoints are identified based on map data of a geographic database. The one or more waypoints define at least part of a route to a destination location. The distance aspect of a first waypoint is a distance between the first waypoint and the user location. A directional aspect for one or more waypoints is determined by the user apparatus. The directional aspect of a first waypoint is an angle between a line connecting the user location to the first waypoint and a reference heading. A cadence is determined by the user apparatus based on distances between consecutive waypoints of the route. A route sequence is determined by the user apparatus based on the distance aspects for the one or more waypoints, the directional aspects for the one or more waypoints, and the cadence. Each waypoint is assigned an audible pitch. The volume assigned to the audible pitch for the first waypoint is determined based on the distance aspect corresponding to the first waypoint. A direction assigned to the audible pitch for the first waypoint is determined based on the directional aspect corresponding to the first waypoint. The user apparatus causes the route sequence to be audibly provided via a sound device.

In accordance with an example embodiment, a method is provided. In an example embodiment, the method comprises determining, by a user apparatus and via one or more location sensors, a user location. The method further comprises determining, by the user apparatus, a distance aspect for one or more waypoints. The one or more waypoints are identified based on the map data of the geographic database. The one or more waypoints define at least part of a route to a destination location. The distance aspect of a first waypoint is a distance between the first waypoint and the user location. The method further comprises determining, by the user apparatus, a directional aspect for one or more waypoints, wherein the directional aspect of a first waypoint is an angle between a line connecting the user location to the first waypoint and a reference heading. The method further comprises determining, by the user apparatus, a cadence based on distances between consecutive waypoints of the route. The method further comprises determining, by the user apparatus, a route sequence based on the distance aspects for the one or more waypoints, the directional aspects for the one or more waypoints, and the cadence. Each waypoint is assigned an audible pitch. The volume assigned to the audible pitch for the first waypoint is determined based on the distance aspect corresponding to the first waypoint. A direction assigned to the audible pitch for the first waypoint is determined based on the directional aspect corresponding to the first waypoint. The method further comprises causing, by the user apparatus, the route sequence to be audibly provided via a sound device.

In an example embodiment, the method further comprises receiving, by the user apparatus, an indication of the destination location; identifying the one or more waypoints between the user location and the destination location; and determining the route from the user location to the destination location based on the identified one or more waypoints. In an example embodiment, the route sequence comprises an audible pitch for each waypoint of the route between the user location and the destination location. In an example embodiment, the route sequence comprises an audible pitch for up to the next twelve waypoints of the route between the user location and the destination location. In an example embodiment, (a) the user location is within a space, (b) the destination location is within the space, and (c) the geographic database comprises map data providing a digital representation of the space. In an example embodiment, the method further comprises determining a user heading via the one or more location sensors, wherein the reference heading is the user heading. In an example embodiment, the audible pitches assigned to the one or more waypoints comprise at least a portion of a musical scale. In an example embodiment, the sound device is a set of headphones, earbuds, hearing aids, or bone conduction devices. In an example embodiment, the volume and direction assigned to the audible pitch corresponding to the first waypoint are configured to make the audible pitch sound as if it was generated at the first waypoint. In an example embodiment, the route sequence is determined responsive to at least one of (a) determining the route to the destination, (b) a predetermined time period elapsing since the route sequence was last provided, (c) the user location being within a first threshold distance of one of the one or more waypoints, (d) the user location being more than a second threshold distance from the route, or (e) a user heading being more than a second threshold angle from an expected user heading determined based on the route and the user location. In an example embodiment, when the user location is within a first threshold distance of a first waypoint of the one or more waypoints, the directional aspect corresponding to the first waypoint is omnidirectional.

In accordance with an example embodiment, an apparatus is provided. In an example embodiment, the apparatus comprises at least one processor; at least one memory storing (a) program code and (b) a geographic database comprising map data; one or more location sensors; and a user interface configured to operate one or more sound devices. The at least one memory and the program code are configured to, with the processor, cause the apparatus to at least determine, via the one or more location sensors, a user location; and determine a distance aspect for one or more waypoints. The one or more waypoints are identified based on the map data of the geographic database. The one or more waypoints define at least part of a route to a destination location. The distance aspect of a first waypoint is a distance between the first waypoint and the user location. The at least one memory and the program code are further configured to, with the processor, cause the apparatus to at least determine a directional aspect for one or more waypoints. The directional aspect of a first waypoint is an angle between a line connecting the user location to the first waypoint and a reference heading. The at least one memory and the program code are configured to, with the processor, cause the apparatus to at least determine a cadence based on distances between consecutive waypoints of the route; and determine a route sequence based on the distance aspects for the one or more waypoints, the directional aspects for the one or more waypoints, and the cadence. Each waypoint is assigned an audible pitch. The volume assigned to the audible pitch for the first waypoint is determined based on the distance aspect corresponding to the first waypoint. A direction assigned to the audible pitch for the first waypoint is determined based on the directional aspect corresponding to the first waypoint. The at least one memory and the program code are configured to, with the processor, cause the apparatus to at least cause, by the user interface, the route sequence to be audibly provided via at least one of the one or more sound devices.

In an example embodiment, the at least one memory and the program code are configured to, with the processor, cause the apparatus to at least receive, via the user interface or the communication interface, an indication of the destination location; identify the one or more waypoints between the user location and the destination location; and determine the route from the user location to the destination location based on the identified one or more waypoints. In an example embodiment, the route sequence comprises an audible pitch for each waypoint of the route between the user location and the destination location. In an example embodiment, the route sequence comprises an audible pitch for up to the next twelve waypoints of the route between the user location and the destination location. In an example embodiment, (a) the user location is within a space, (b) the destination location is within the space, and (c) the geographic database comprises map data providing a digital representation of the space. In an example embodiment, the at least one memory and the program code are configured to, with the processor, cause the apparatus to at least determine a user heading via the one or more location sensors, wherein the reference heading is the user heading. In an example embodiment, the audible pitches assigned to the one or more waypoints comprise at least a portion of a musical scale. In an example embodiment, the sound device is a set of headphones, earbuds, hearing aids, or bone conduction devices. In an example embodiment, the volume and direction assigned to the audible pitch corresponding to the first waypoint are configured to make the audible pitch sound as if it was generated at the first waypoint. In an example embodiment, the route sequence is determined responsive to at least one of (a) determining the route to the destination, (b) a predetermined time period elapsing since the route sequence was last provided, (c) the user location being within a first threshold distance of one of the one or more waypoints, (d) the user location being more than a second threshold distance from the route, or (e) a user heading being more than a second threshold angle from an expected user heading determined based on the route and the user location. In an example embodiment, when the user location is within a first threshold distance of a first waypoint of the one or more waypoints, the directional aspect corresponding to the first waypoint is omnidirectional.

In accordance with an example embodiment, a computer program product is provided that comprises at least one non-transitory computer-readable storage medium having computer-executable program code instructions stored therein. The computer-executable program code instructions comprise program code instructions that are configured, when executed by a processor of an apparatus, to cause the apparatus to determine, via one or more location sensors, a user location. The computer-executable program code instructions comprise program code instructions that are further configured, when executed by a processor of an apparatus, to cause the apparatus to determine a distance aspect for one or more waypoints. The one or more waypoints are identified based on map data of a geographic database. The one or more waypoints define at least part of a route to a destination location. The distance aspect of a first waypoint is a distance between the first waypoint and the user location. The computer-executable program code instructions comprise program code instructions that are configured, when executed by a processor of an apparatus, to cause the apparatus to determine a directional aspect for one or more waypoints. The directional aspect of a first waypoint is an angle between a line connecting the user location to the first waypoint and a reference heading. The computer-executable program code instructions comprise program code instructions that are configured, when executed by a processor of an apparatus, to cause the apparatus to determine a cadence based on distances between consecutive waypoints of the route. The computer-executable program code instructions comprise program code instructions that are configured, when executed by a processor of an apparatus, to cause the apparatus to determine a route sequence based on the distance aspects for the one or more waypoints, the directional aspects for the one or more waypoints, and the cadence. Each waypoint is assigned an audible pitch. The volume assigned to the audible pitch for the first waypoint is determined based on the distance aspect corresponding to the first waypoint. A direction assigned to the audible pitch for the first waypoint is determined based on the directional aspect corresponding to the first waypoint. The computer-executable program code instructions comprise program code instructions that are configured, when executed by a processor of an apparatus, to cause the apparatus to cause the route sequence to be audibly provided via one or more sound devices.

In an example embodiment, the computer-executable program code instructions comprise program code instructions that are configured, when executed by a processor of an apparatus, to cause the apparatus to receive, via the user interface or a communication interface, an indication of the destination location; identify the one or more waypoints between the user location and the destination location; and determine the route from the user location to the destination location based on the identified one or more waypoints. In an example embodiment, the route sequence comprises an audible pitch for each waypoint of the route between the user location and the destination location. In an example embodiment, the route sequence comprises an audible pitch for up to the next twelve waypoints of the route between the user location and the destination location. In an example embodiment, (a) the user location is within a space, (b) the destination location is within the space, and (c) the geographic database comprises map data providing a digital representation of the space. In an example embodiment, the computer-executable program code instructions comprise program code instructions that are configured, when executed by a processor of an apparatus, to cause the apparatus to determine a user heading via the one or more location sensors, wherein the reference heading is the user heading. In an example embodiment, the audible pitches assigned to the one or more waypoints comprise at least a portion of a musical scale. In an example embodiment, the sound device is a set of headphones, earbuds, hearing aids, or bone conduction devices. In an example embodiment, the volume and direction assigned to the audible pitch corresponding to the first waypoint are configured to make the audible pitch sound as if it was generated at the first waypoint. In an example embodiment, the route sequence is determined responsive to at least one of (a) determining the route to the destination, (b) a predetermined time period elapsing since the route sequence was last provided, (c) the user location being within a first threshold distance of one of the one or more waypoints, (d) the user location being more than a second threshold distance from the route, or (e) a user heading being more than a second threshold angle from an expected user heading determined based on the route and the user location. In an example embodiment, when the user location is within a first threshold distance of a first waypoint of the one or more waypoints, the directional aspect corresponding to the first waypoint is omnidirectional.

In accordance with yet another example embodiment of the present invention, an apparatus is provided that comprises means for determining, via one or more location sensors, a user location. The apparatus further comprises means for determining a distance aspect for one or more waypoints. The one or more waypoints are identified based on the map data of the geographic database. The one or more waypoints define at least part of a route to a destination location. The distance aspect of a first waypoint is a distance between the first waypoint and the user location. The apparatus further comprises means for determining a directional aspect for one or more waypoints, wherein the directional aspect of a first waypoint is an angle between a line connecting the user location to the first waypoint and a reference heading. The apparatus further comprises means for determining a cadence based on distances between consecutive waypoints of the route. The apparatus further comprises means for determining a route sequence based on the distance aspects for the one or more waypoints, the directional aspects for the one or more waypoints, and the cadence. Each waypoint is assigned an audible pitch. The volume assigned to the audible pitch for the first waypoint is determined based on the distance aspect corresponding to the first waypoint. A direction assigned to the audible pitch for the first waypoint is determined based on the directional aspect corresponding to the first waypoint. The apparatus further comprises means for causing the route sequence to be audibly provided via a sound device.

BRIEF DESCRIPTION OF THE DRAWINGS

Figure 1:
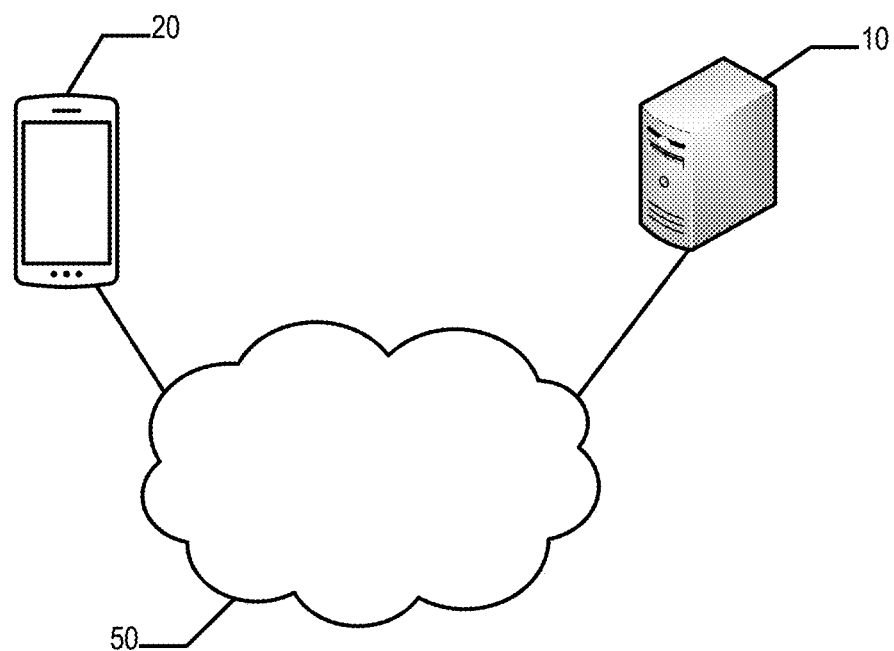
Figure 2A:
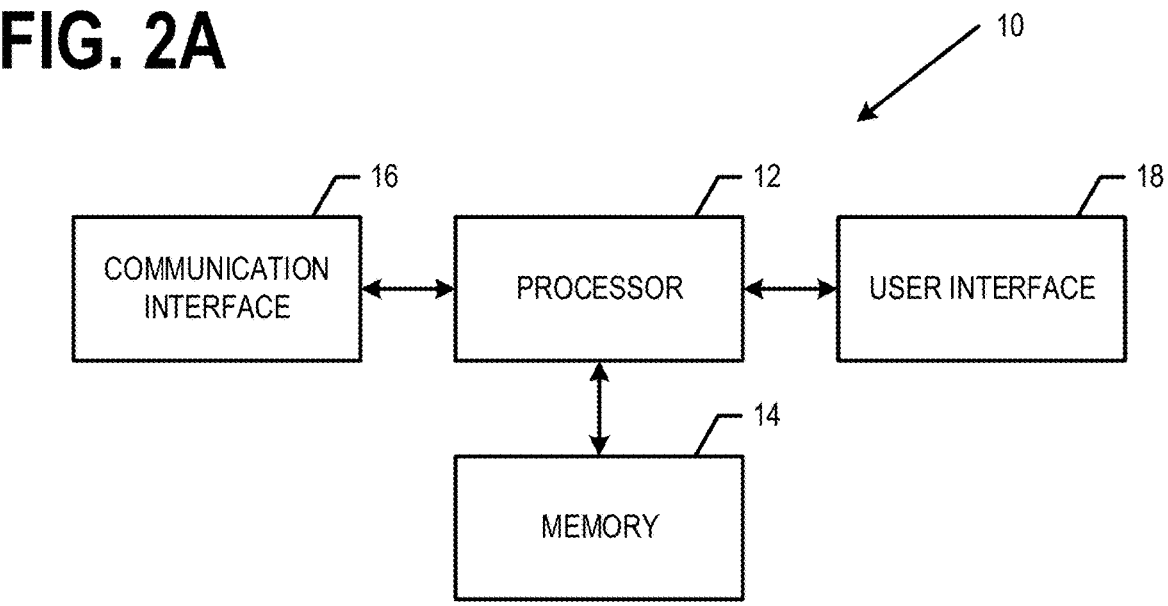
Figure 2B:
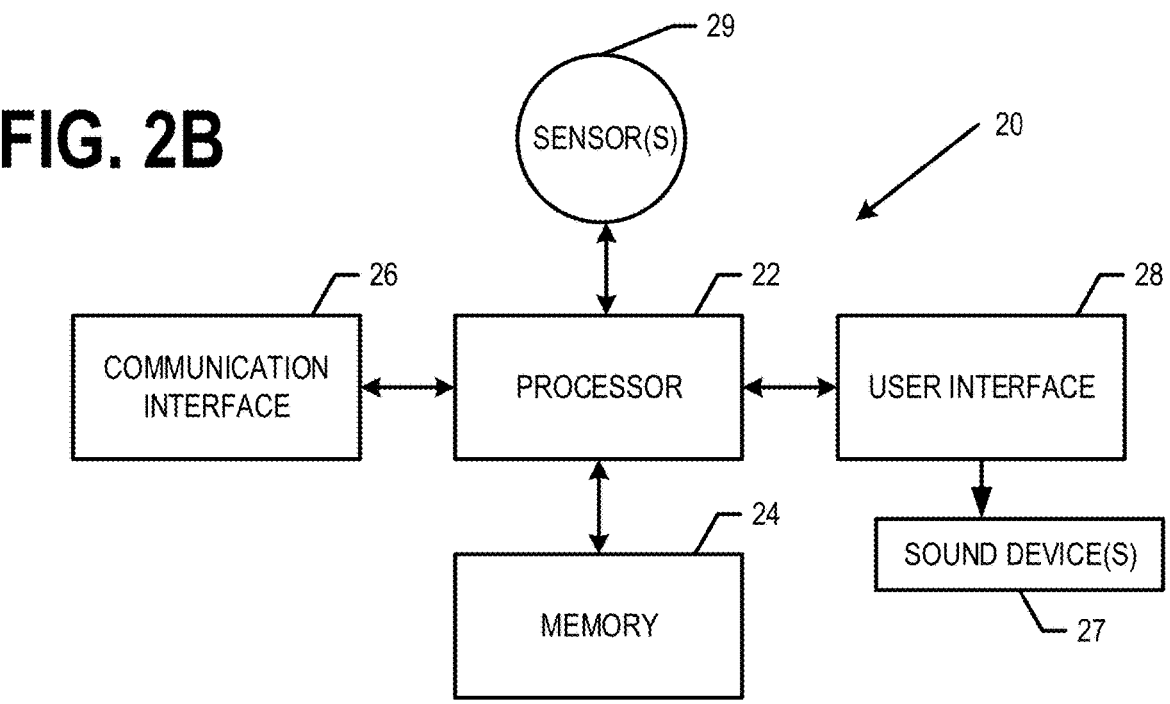
Figure 4A:
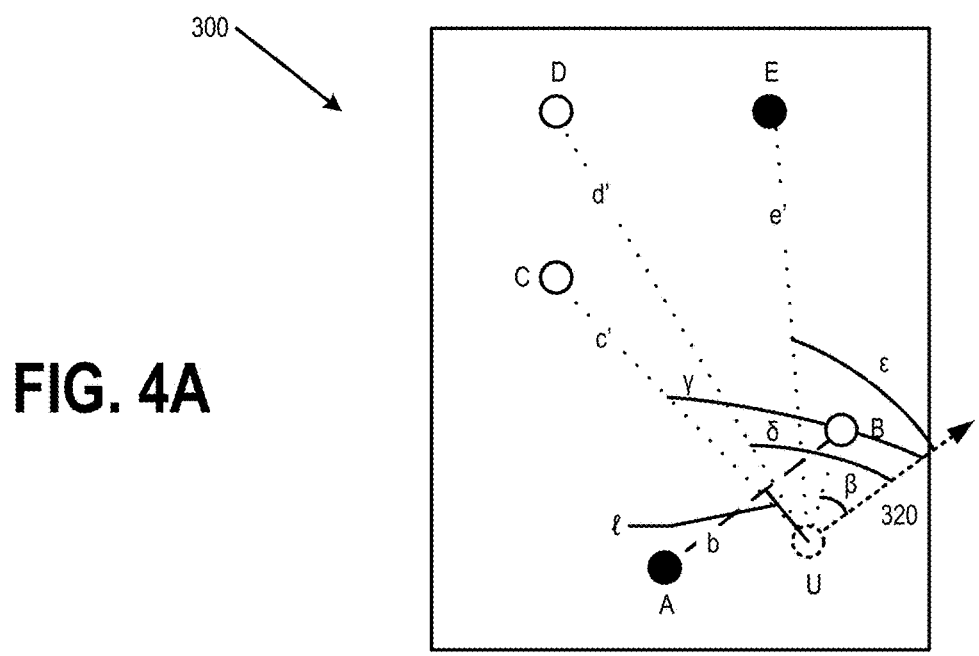
Figure 4B:
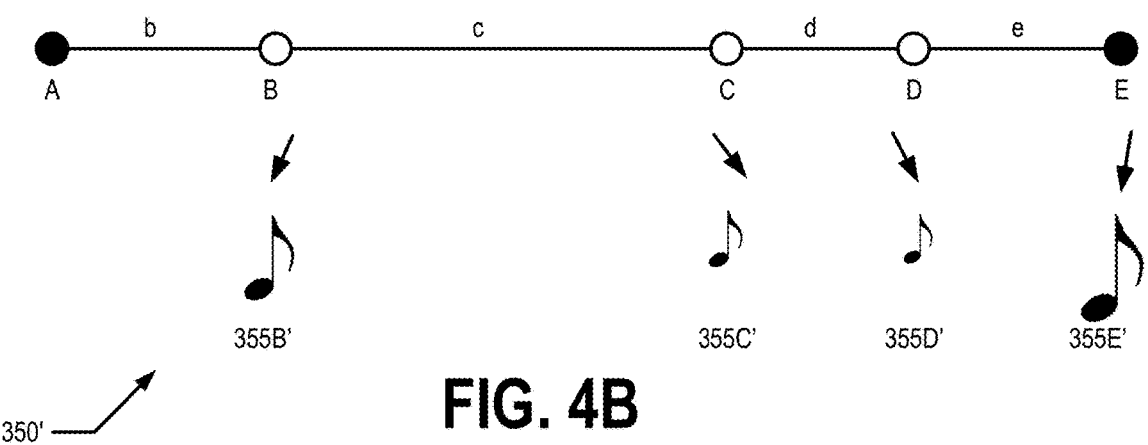
Figure 4C:
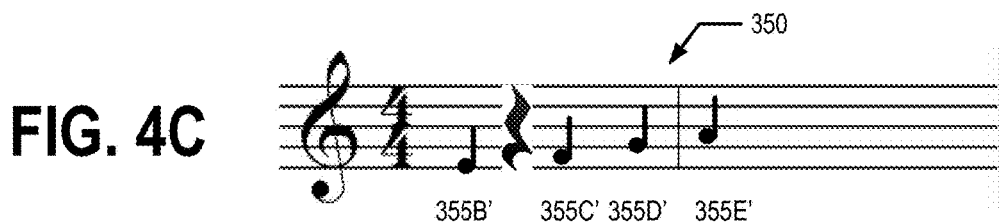
Figure 5C:
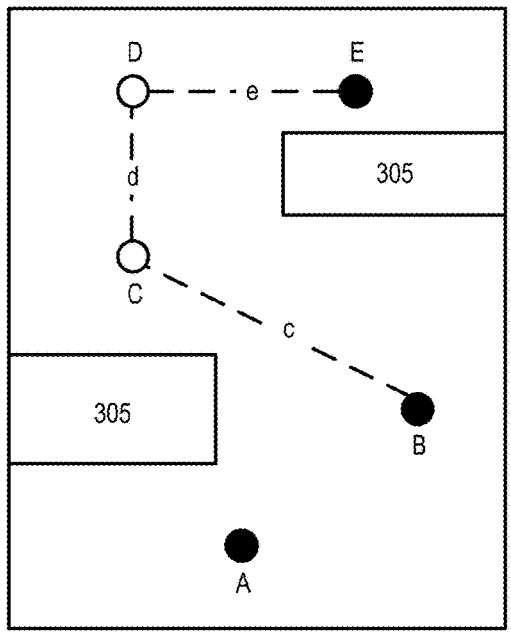
Figure 5C:
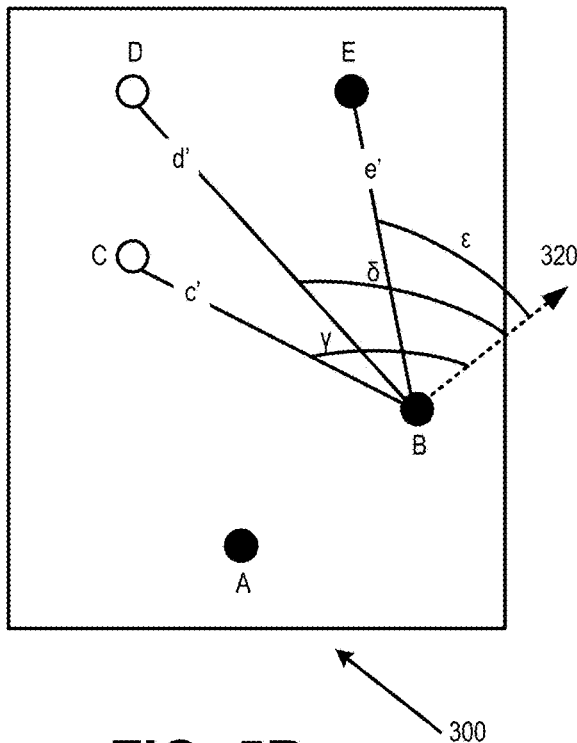
Figure 5C:
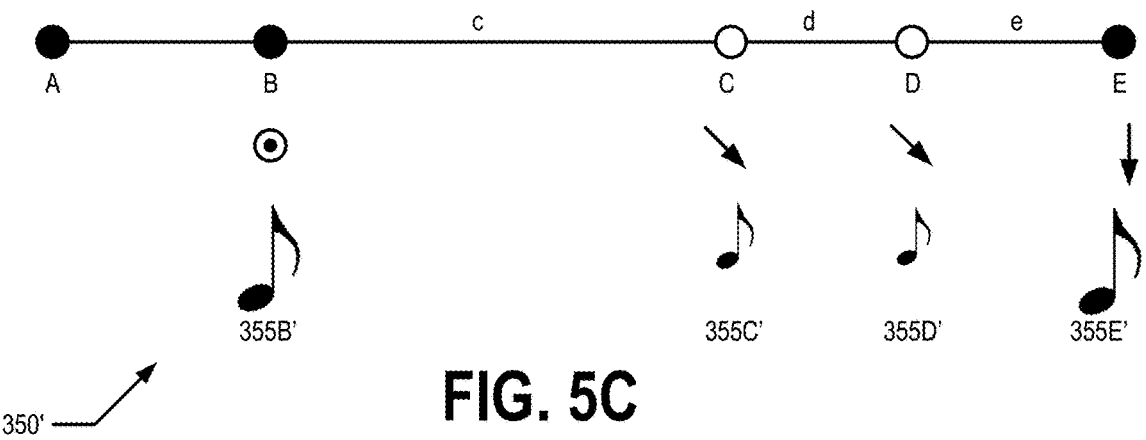
Figure 6:
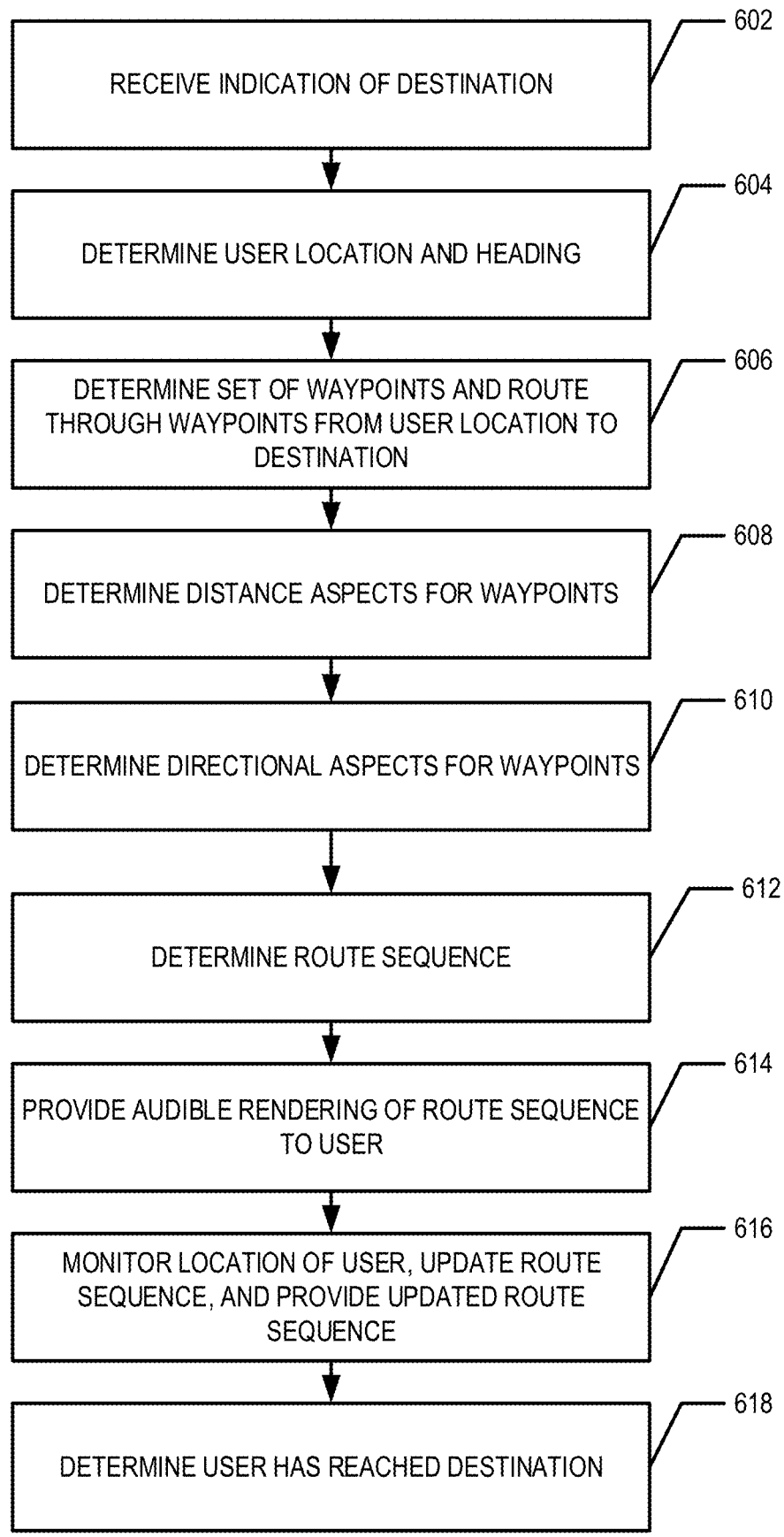

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a map apparatus that may be specifically configured in accordance with an example embodiment;

FIG. 2B is a block diagram of a user apparatus that may be specifically configured in accordance with an example embodiment;

FIGS. 3A and 3B illustrate a sequence of waypoints of a route within a space, in accordance with an example embodiment;

FIGS. 3C and 3D illustrate representations of a route sequence corresponding to the route shown in FIGS. 3A and 3B, in accordance with an example embodiment;

FIG. 4A shows an instance where a user has wandered from the route within the space, in accordance with an example embodiment;

FIGS. 4B and 4C illustrate representations of a route sequence corresponding to the scenario shown in FIG. 4A, in accordance with an example embodiment;

FIGS. 5A and 5B illustrate the sequence of waypoints of the route within the space when the user has reached waypoint B, and FIG. 5C illustrates a representation of a route sequence corresponding to the route shown in FIGS. 5A and 5B, in accordance with an example embodiment;

FIG. 6 is a flowchart illustrating operations performed, such as by the user apparatus of FIG. 2B to provide a route navigation using an audible route sequence, in accordance with an example embodiment; and FIG. 7 is a flowchart illustrating operations performed, such as by the user apparatus of FIG. 2B to update an audible route sequence as a user traverses a route, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to provide audible route guidance. For example, various embodiments provide an audible and/or harmonic route sequence that represents a route from a user's location to a destination based on one or more waypoints along the route within a 3D sounds space. For example, each waypoint of the route may be represented by a harmonic note or pitch. Each harmonic note or pitch of the route sequence may be conditioned based on a directional aspect and distance aspect describing the spatial relationship between the waypoint and the user's location and/or a reference heading. For example, the reference heading may be the user's heading (e.g., the direction the user is facing or moving in). For example, a harmonic note or pitch of the route sequence may be conditioned in direction and/or volume such that, to the user, it sounds as if the harmonic note or pitch was generated and/or originated at the corresponding waypoint. Each waypoint of the route may be represented by a different harmonic note and/or pitch. In an example embodiment, if a user is located at a waypoint (and/or within a first threshold distance of a waypoint) the note and/or pitch corresponding to that waypoint may be provided as an omnidirectional (rather than directional) sound. For example, if a user is located at a waypoint (and/or within a first threshold distance of a waypoint) the note and/or pitch corresponding to that waypoint may sound as if it is being generated and/or originating from all around (e.g., 360 degrees around) the user. In an example embodiment, a cadence of the route sequence (e.g., the time between consecutive notes and/or pitches) is determined based on the distance between the consecutive waypoints of the route. For example, if waypoints A and B are relatively close together compared to waypoints B and C, the notes or pitches representing waypoints A and B will be provided closer together in time than the notes or pitches representing waypoints B and C. Thus, in various embodiments, the route sequence provides an audible and/or harmonic representation of the route that provides the user with directional and distance guidance from the user's location to a destination. In an example embodiment, the user may wear a personal sound device(s) (e.g., headphones, earbuds, hearing aids, bone conducting device, and/or the like) and the route sequence may be provided (e.g., audibly) via the personal sound device(s).

In various embodiments, the route is located within a space, such as an indoor space (e.g., a shopping mall, stadium or arena, and/or the like) and/or outdoor space (e.g., fair grounds, a festival, amusement park, public park, and/or the like). In various embodiments, a user receiving and/or utilizing the route navigation may be a pedestrian, cyclist, scooter rider, Segway rider, vehicle operator, golf cart driver, boat or personal water craft operator, a motor or non-motor vehicle operator, and/or the like. The route sequence may provide the user with a route guidance from the user's location to a destination such that the user avoids obstacles within the space. For example, the route may be configured to guide the user around obstacles such as walls, booths, stores, displays, and/or the like within the space.

In various embodiments, the route is determined based on a digital map (e.g., a geographic database) corresponding to the space. For example, the digital map may comprise a plurality of possible waypoints within the space, information/data identifying and/or corresponding to obstacles within the space, points of interest within the space (e.g., possible destinations, and/or the like), and/or other information/data relating to the spatial layout and/or topology of the space. In an example embodiment, the digital map may be received and stored by the user apparatus. For example, the user apparatus may request the digital map corresponding to the space from a map apparatus and receive the digital map provided by the map apparatus via, for example, a wireless network. For example, the map apparatus may be configured to generate a digital map of the space, update and/or maintain the digital map of the space, and/or provide the digital map of the space. In response to receiving an indication of a destination within and/or in the vicinity of the space (e.g., via user input) the user apparatus may be configured to determine a route from the current user location (or another origin/starting location as indicated via user input) to the destination by identifying one or more waypoints using the digital map. The one or more waypoints may be ordered such that if the user traverses the waypoints in the determined order, the user will travel from the user's current location (or other origin/starting location) to the destination in an efficient manner (e.g., shortest distance, shortest time, and/or the like) while avoiding obstacles within the space. The user apparatus may then provide the user with a route sequence representing the route such that the user may traverse the route based on the route sequence. In an example embodiment, the user apparatus may provide the user location (or other origin/starting location) and destination to the map apparatus, the map apparatus may determine the route, and the map apparatus may provide the route (e.g., ordered list of waypoints) such that the user apparatus receives the route and may provide the route sequence to the user to guide the user along the route.

In an example embodiment, the route sequence may be updated as the user traverses the route. For example, an updated route sequence may be provided at particular time intervals, when a user provides input to the user apparatus indicating the user would like to hear an updated route sequence, if the user is located at (and/or within a first threshold distance of) a waypoint, if a user is more than a second threshold distance from the route, and/or the like. To update the route sequence, the user apparatus may determine the user location and/or heading and determine a distance and/or directional aspect for each remaining waypoint of the route (e.g., the waypoints between the user's current location and the destination). In an example embodiment, the cadence of the route sequence need not be updated as the distances between consecutive waypoints of the route are not dependent on the user's location.

FIG. 1 provides an illustration of an example system that can be used in conjunction with various embodiments of the present invention. As shown in FIG. 1, the system may include one or more map apparatuses 10, a one or more user apparatuses 20, one or more networks 50, and/or the like. In various embodiments, the user apparatus 20 may be an in vehicle navigation system, vehicle control system, personal navigation system, mobile computing device, personal mobile computing device, mobile data gathering platform, and/or the like. In some embodiments, a user apparatus 20 may move and/or travel with the user such that the location of the user apparatus 20 is generally and/or approximately the same as the user location. In various embodiments, the user apparatus 20 may be a smartphone, tablet, personal digital assistant (PDA), navigation device, laptop, and/or other mobile computing device. In an example embodiment, the map apparatus 10 may be a server, group of servers, distributed computing system, and/or other computing system. For example, the map apparatus 10 may be in communication with one or more user apparatuses 20 and/or the like via one or more wired or wireless networks 50.

In an example embodiment, a map apparatus 10 may comprise components similar to those shown in the example map apparatus 10 diagrammed in FIG. 2A. In an example embodiment, the map apparatus 10 is configured to define, receive, and/or generate map information/data of one or more digital maps each corresponding to a space, update and/or maintain map information/data, provide map information/data of one or more digital maps and/or portions thereof, and/or the like. For example, as shown in FIG. 2A, the map apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, the user apparatus 20 may be configured to determine a user location and/or heading, determine distance and/or directional aspects corresponding to one or more waypoints, determine a cadence of a route sequence, generate a route sequence based on the distance and/or directional aspects corresponding to the waypoints and/or the cadence, audibly provide the route sequence, update a route sequence and provide the updated route sequence, and/or the like. For example, the user apparatus 20 may comprise one or more sensors that may be used to determine the user location and/or heading. For example, the user location may be an absolute location (e.g., a geolocation determined by a global navigation satellite system (GNSS)) or a relative location (e.g., relative to one or more known positions within the space). In various embodiments, the space is an indoor space (e.g., shopping mall, stadium or arena, public park, and/or the like) and the use apparatus 20 may comprise one or more sensors configured for performing indoor location determinations (e.g., via iBeacons, radio frequency identification (RFID), triangulation methods, and/or the like). In an example embodiment, as shown in FIG. 2B, the probe apparatus 20 may comprise a processor 22; memory 24; a communications interface 26; a user interface 28 coupled, comprising, and/or in communication with one or more sound devices; one or more sensors 29 (e.g., a location sensor such as a GNSS sensor; IMU sensors; camera(s); indoor location determination sensors such as an iBeacons receiver/transmitter, RFID receiver/transmitter, and/or the like); and/or other components configured to perform various operations, procedures, functions or the like described herein. In at least some example embodiments, the memory 24 is non-transitory. In various embodiments, the one or more sounds devices are personal sound devices such as a set of headphones, earbuds, hearing aids, or bone conduction devices, and/or the like.

In an example embodiment, the map apparatus 10 may be in communication with one or more of user apparatuses 20. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a user apparatus 20 may be in communication with a map apparatus 10 via the network 50. For example, a user apparatus 20 may communicate with the map apparatus 10 via a network, such as the Cloud. For example, the Cloud may be a computer network that provides shared computer processing resources and data to computers and other devices connected thereto. For example, the user apparatus 20 may be configured to receive a digital map and/or one or more portions (e.g., tiles) thereof corresponding to a space from the map apparatus 10 or another map service connected via the network and provide a route sequence to the user based on a route determined based on the digital map and/or one or more portions thereof corresponding to the space.

Certain example embodiments of the user apparatus 20 and the map apparatus 10 are described in more detail below with respect to FIGS. 2A and 2B.

II. Example Operation

Example embodiments provide methods, apparatus, systems, computer program products, and/or the like for providing audible route guidance. For example, various embodiments provide a harmonic and/or audible route sequence comprising a plurality of harmonic notes and/or pitches configured to guide a user along a route. In various embodiments, the route comprises an ordered series of waypoints and each harmonic note and/or pitch corresponds to one of the waypoints. In an example embodiment, the route sequence comprises a harmonic note and/or pitch for each waypoint of the route. In an example embodiment, if the route comprises more than a maximum number of waypoints (e.g., five, eight, twelve, or the like) the route sequence may comprise the maximum number of harmonic notes and/or pitches corresponding to consecutive waypoints of the route and as each waypoint is reached, the route sequence is may be updated to include the next waypoint until the number of waypoints remaining is at or below the maximum number and the route sequence comprises a harmonic note and/or pitch for each remaining waypoint of the route. In various embodiments, the user apparatus 20 (and/or map apparatus 10) may determine a route from a location of a user (and/or other origin/starting location) to a destination based on a digital map and then generate and provide the route sequence to the user to guide the user along the route to the destination.

In various embodiments, a digital map comprises map information/data corresponding to a space. In various embodiments, the space may be an indoor space (e.g., shopping mall, arena, stadium, and/or the like), an outdoor space (e.g., fairgrounds, festival, amusement park, city park, state park, national park, and/or the like), a geographic area (e.g., a neighborhood, town, city, state, and/or the like), and/or other space. The map information/data may comprise information/data corresponding to a plurality of waypoints within the space. In various embodiment, a waypoint may be a predetermined location within the space that a user may traverse through and which may be used a destination and/or through point of a route. The map information/data may comprise information/data corresponding to a one or more obstacles within the space. In various embodiments, an obstacle may be a predetermined location or extended area within the space that is not traversable (e.g., a wall, store, display, railing, fence, garbage can, fountain, planter or garden bed, and/or the like). For example, an obstacle may be a point, line, or area (e.g., polygon) through which a user cannot or should not traverse through/across. In various embodiments, the map information/data may comprise information/data corresponding to one or more points of interest (POIs). For example, a user may provide input indicating a destination. In an example embodiment, the input indicating the destination may be a selecting of or entering of information/data identifying a POI. In an example embodiment, a POI may be associated with a waypoint or obstacle. For example, if the space is an amusement park, a POI corresponding to the Super Duper Rollercoaster may be associated with an obstacle that is located at, includes, and/or corresponds to the entrance to the line for the Super Duper Rollercoaster. Thus, in various embodiments, a digital map of the space comprises the map information/data needed to generate a traversable route through the space from the user location (and/or other origin/starting location) to a destination within the space that passes through an ordered set of waypoints within the space.

In various embodiments, a map apparatus 10 may generate, update, maintain and/or the like a digital map of the space. A user apparatus 20 may request the digital map of the space (and/or portion thereof), for example, in response to determining that the user apparatus 20 is located at and/or within the space, a user activating an application corresponding to the space, and/or the like. In an example embodiment, the digital map of the space may be provided as part of an application corresponding to the space (e.g., a digital visitor's guide). The map apparatus 10 may receive the request for the digital map of the space (and/or portion thereof) and provide the digital map of the space (and/or portion thereof). The user apparatus 20 may then receive the digital map of the space (and/or portion thereof) and store the digital map (and/or portion thereof) in memory 24.

Examples of Route Sequences

Responsive to receiving a destination (e.g., via user input) the user apparatus 20 (and/or map apparatus 10) may identify a series and/or ordered list of waypoints from the map information/data of the digital map through which a user may traverse to efficiently travel from the current user location (or other origin/starting location) to the destination. For example, the route may be shortest route in distance or in time through the space from the user location (or other origin/starting location) to the destination while avoiding obstacles. For example, FIG. 3A illustrates a space 300 wherein the current user location is location A and the destination is location E. Location E may be a waypoint, POI, or other location. Waypoints B, C, and D are identified such that a user may traverse from location A to waypoint B to waypoint C to waypoint D to location E to efficiently travel from the current user location at location A to the destination at location E while avoiding the obstacles 305. For example, the route 310 comprises route portions b, c, d, and e which are defined by the user location (e.g., location A), the consecutive waypoints of the route, and the destination (e.g., location E). As should be understood, the route may be determined via various route determination algorithms and based on the map information/data of the digital map of the space, an origin location (e.g., the user location or another origin/starting location), a destination location, user route preferences (e.g., avoid stairs, wheelchair/stroller accessible, shortest distance, and/or the like), and/or the like.

FIG. 3B illustrates distance aspects and directional aspects that may be used in the generation of the route sequence, in various embodiments. For example, distance aspect b' is the distance between the user location (e.g., location A) and waypoint B. Similarly distance aspects c', d', and e' are the distance between the user location (e.g., location A) and the corresponding one of waypoint C, waypoint D, and location E. For example, a distance aspect may be the Euclidean and/or straight line distance between the user location and the corresponding waypoint (and/or the destination). In an example embodiment, the directional aspect $\beta$ is the angle between a reference heading 320 and a straight line drawn between waypoint B and the user location (e.g., location A). In an example embodiment, the reference heading 320 is the user heading. In an example embodiment, the user heading is the direction the user is facing and/or moving in and is determined based at least in part on an orientation of the user apparatus 20. For example, the user apparatus 20 may comprise one or more sensors 29 configured to determine an orientation of the user apparatus 20 and, based on the determined orientation of the user apparatus 20, determine a user heading. Similarly, the directional aspects $\gamma$, $\delta$, and $\varepsilon$ are the angles between the reference heading 320 and a straight line drawn between the corresponding one of waypoint C, waypoint D, and location E and the user location (e.g., location A). For example, a directional aspect may be the angle between a reference heading 320 (e.g., the user heading) and a straight line connecting the corresponding waypoint (and/or the destination) to the user location. Thus, in an example embodiment, the distance aspect and directional aspect of a waypoint provide the coordinates of the corresponding waypoint in a polar coordinate system centered on the user location and directed such that the azimuthal angle is measured with respect to the reference heading 320 (e.g., the user heading).

In various embodiments, a route sequence comprises a sequence of harmonic notes and/or pitches. Each harmonic note or pitch corresponds to a waypoint of the route (and/or the destination). For example, each waypoint of the route 310 and/or location (e.g., the origin location at location A and/or destination location E) is assigned a harmonic note and/or pitch. For example, as shown in FIGS. 3C and 3D, a route sequence 350 representing the route 310 shown in FIG. 3A comprises five notes and/or pitches 355A, 355B, 355C, 355D, and 355E. The origin note and/or pitch 355A corresponds to the user location and/or the origin/starting location (e.g., location A). The mid-sequence notes and/or pitches 355B, 355C, and 355D correspond to waypoints B, C, and D respectively. The destination note and/or pitch 355E corresponds to the destination (e.g., location E). As should be understood, the number of notes and/or pitches of a route sequence will be determined based on the number of remaining waypoints of the route between the user location and the destination and, in some embodiments, a maximum number, wherein the maximum number is a predetermined and/or user-selected maximum number of notes and/or pitches in a route sequence. For example, the maximum number may be three, five, eight, twelve or the like. In an example embodiment, the maximum number may be determined based on user input, the number of notes and/or pitches in a scale that is being used for selection/assignment of the notes and/or pitches, and/or the like.

Each note and/or pitch 355 (e.g., 355A, 355B, 355C, 355D, 355E) of the route sequence is a unique note and/or pitch. For example, the frequency of the note and/or pitch 355A is different from the frequency of the notes and/or pitches 355B, 355C, 355D, and 355E. Similarly, the frequency of the notes and/or pitches 355B, 355C, and 355E are different from each of the others of 355A, 355B, 355C, 355D, and 355E, such that each waypoint of the route is represented by a note and/or pitch of a unique frequency in the route sequence 350. Said differently once, a frequency, note, and/or pitch is assigned to a waypoint (or location such as the origin/starting location or destination) that frequency note, and/or pitch is not assigned to any other waypoint (or location) of the route. For example, the pitches and/or notes 355 assigned to each waypoint and/or location of the route may comprise at least a portion of a musical scale. For example, the pitches and/or notes 355 assigned to each waypoint and/or location of the route may comprise at least a portion of a harmonic scale, a major scale, a minor scale, and/or the like. In various embodiments, the musical scale used to assign pitches and/or notes 355 to each waypoint and/or location of the route is predetermined, determined based on user input/preferences, determined based on music currently being played by the user apparatus 20, and/or the like. For example, if the user apparatus 20 is playing a song (e.g., via the sound device 27) in the key of G, the G major scale may be used to assign pitches and/or notes 355 to each waypoint and/or location of the route to compliment the currently playing song or, to contrast the currently playing song, the C major scale or another scale may be used to assign pitches and/or notes 355 to each waypoint and/or location of the route.

To generate the route sequence 350, each note and/or pitch 355 of the route sequence is conditioned to sound as if the note and/or pitch 355 is being generated at the location of the corresponding waypoint. For example, as shown in FIG. 3C, when the user location is location A, the note and/or pitch 355A corresponding to location A is provided at a maximum volume of the route sequence 350 to indicate that the distance aspect of location A is zero. In another example, when the user location is location A, the note and/or pitch 355B corresponding to waypoint B is provided at volume B, the note and/or pitch 355C corresponding to waypoint C is provided at volume C, the note and/or pitch 355D corresponding to waypoint D is provided at volume D, and the note and/or pitch 355E corresponding to location E is provided at volume E. As the location aspect b' corresponding to waypoint B is less and/or shorter than the location aspect c' corresponding to waypoint C, volume B is louder than volume C to indicate that waypoint B is closer to the user location at location A than waypoint C. Similarly, as the location aspects b' and c' corresponding to waypoints B and C, respectively, are less and/or shorter than the location aspect d' corresponding to waypoint D, volumes b and c are louder than volume D to indicate that waypoints B and C are closer to the user location at location A than waypoint D. In an example embodiment, as the location aspects b', c', and d' corresponding to waypoints B, C, and D, respectively, are less and/or shorter than the location aspect e' corresponding to location E, volumes b, c, and d are louder than volume E to indicate that waypoints B, C, and D are closer to the user location at location A than location E. In an example embodiment, volume E may be a minimum volume of the route sequence 350. In an example embodiment, the minim volume of the route sequence 350 may be predetermined and/or determined based on user input/preferences. In an example embodiment, volume E may be the maximum volume of the route sequence 350 and/or another volume between the maximum volume and the minimum volume of the route sequence 350 to indicate that the location E, represented by note and/or pitch 355E, is the destination.

In various embodiments, the directionality of a note and/or pitch 355 is determined based on the corresponding directional aspect. For example, when the user location is location A, the note and/or pitch 355A corresponding to location A may be provided as an omnidirectional sound such that, to the user, it sounds as if the note and/or pitch 355A is being generated all around the user (e.g., in 360 degrees about the user). In another example, when the user location is location A and the reference heading 320 (e.g., the user heading) is as shown in FIG. 3B, the note and/or pitch 355B corresponding to waypoint B is provided as a directional note and/or pitch such that, to the user, it sounds as if the note and/or pitch 355B is being generated at waypoint B. For example, the directionality of the note and/or pitch 355B is determined based on directional aspect β. For example, the note and/or pitch 355B may sound, to the user, as if the note and/or pitch 355B was generated at a location β degrees to the user's right. Similarly, when the user location is location A and the reference heading 320 (e.g., the user heading) is as shown in FIG. 3B, the note and/or pitch 355C corresponding to waypoint C is provided as a directional note and/or pitch such that, to the user, it sounds as if the note and/or pitch 355C is being generated at waypoint C. For example, the directionality of the note and/or pitch 355C is determined based on directional aspect γ. For example, the note and/or pitch 355C may sound, to the user, as if the note and/or pitch 355C was generated at a location γ degrees to the user's left. Similarly, when the user location is location A and the reference heading 320 (e.g., the user heading) is as shown in FIG. 3B, the note and/or pitch 355D corresponding to waypoint D is provided as a directional note and/or pitch such that, to the user, it sounds as if the note and/or pitch 355D is being generated at waypoint D. For example, the directionality of the note and/or pitch 355D is determined based on directional aspect δ. For example, the note and/or pitch 355D may sound, to the user, as if the note and/or pitch 355D was generated at a location δ degrees to the user's left. In the same vein, when the user location is location A and the reference heading 320 (e.g., the user heading) is as shown in FIG. 3B, the note and/or pitch 355E corresponding to waypoint E is provided as a directional note and/or pitch such that, to the user, it sounds as if the note and/or pitch 355E is being generated at waypoint E. For example, the directionality of the note and/or pitch 355E is determined based on directional aspect ε. For example, the note and/or pitch 355E may sound, to the user, as if the note and/or pitch 355E was generated at a location c degrees to the user's right.

In various embodiments, the rhythm and/or cadence of the route sequence 350 may represent and/or encode distances between consecutive waypoints and/or locations of the route 310. For example, in an example embodiment, each note and/or pitch 355 is of the same temporal length. For example, each note and/or pitch 355 is a quarter note, half note, whole note, and/or the like such that each note and/or pitch 355 (e.g., 355A, 355B, 355C, 355D, 355E) is the same temporal length. The temporal distance between the notes in the route sequence may represent the relative distances between consecutive waypoints and/or locations. For example, the temporal distance between when note and/or pitch 355A is provided and when note and/or pitch 355B is provided during the provision of the route sequence 350 may be based on the distance of route portion b. In an example embodiment, the temporal distance between when note and/or pitch 355A is provided and when note and/or pitch 355B is provided during the provision of the route sequence 350 may be based on the distance of route portion b as compared to the distances of route portions c, d, and e. For example, in the illustrated route 310 shown in FIG. 3A, route portion c is longer than route portions b, d, and e; route portion d is shorter than route portions b, c, and e; and route portions b and e are similar in length. In the corresponding route sequence 350, according to an example embodiment, the temporal distance between note and/or pitch 355B and note and/or pitch 355C is greatest temporal distance between consecutive notes and/or pitches 355 of the route sequence; the temporal distance between note and/or pitch 355C and note and/or pitch 355D is smallest temporal distance between consecutive notes and/or pitches 355 of the route sequence; and the temporal distance between notes and/or pitches 355A and 355B is approximately the same and/or similar to the temporal distance between notes and/or pitches 355D and 355E. Thus, the rhythm and/or cadence of the route sequence 350 may represent and/or encode the distance between consecutive waypoints and/or locations of the route 310, in an example embodiment.

In various embodiments, the route sequence 350 may be provided to a user at the start of the user navigating the route. Updated route sequences 350' may then be provided to the user at various points and/or times as the user traverses the route 310 to the destination (e.g., location E). For example, in an example embodiment, updated route sequences 350' may be provided if a predetermined period of time since a route sequence 350 (and/or updated route sequence 350') has elapsed. For example, the predetermined time period may be a preset time (e.g., every 30 seconds, every minute, every two minutes, and/or the like), a time set based on user input/preferences, based on average expected time for a user to traverse the distance between consecutive waypoints and/or locations of the route, based on the expected time for a user to traverse the distance between a first waypoint/location and a consecutive, succeeding waypoint and/or location of the route, and/or the like. In an example embodiment, the user may provide user input (e.g., via the user interface 28) requesting an updated route sequence 350' be provided and/or played. In various embodiments, the user location may be monitored periodically (e.g., every second, every five, ten, twenty, thirty, or forty-five seconds, every minute, and/or the like) and it may be determined if the user is located at a waypoint and/or within a first threshold distance of a waypoint (e.g., a foot, a yard, a meter, and/or the like), if the user location is more than a second threshold distance from the route, or if the heading of user is more than a second threshold angle from an expected user heading based on the route 310. If the first threshold requirement is satisfied (e.g., the user location indicates the user is located at a waypoint and/or within a first threshold distance of a waypoint), an updated route sequence 350' may be provided that indicates that the user is located at a waypoint (e.g., as shown in FIGS. 5A, 5B, and 5C). If the second threshold requirement is satisfied (e.g., the user location indicates the user is located more than a second threshold distance from the route or the user heading indicates the user is more than a second threshold angle from an expected heading based on the route 310 and the user location), an updated sequence 350' may be provided to help guide the user to the next waypoint (e.g., as shown in FIGS. 4A, 4B, and 4C).

FIGS. 4A, 4B, and 4C illustrate an example of when a second threshold requirement is satisfied and an updated route sequence 350' is determined/generated and provided to the user. For example, FIG. 4A shows the space 300 and route 310 at some time t when the user has traveled from location A to location U. For example, the user apparatus 20 may monitor the user location and/or heading and determine at time t that the user location is location U and the reference heading (e.g., the user heading) 320 is as shown in in FIG. 4A. The location U is a distance $\epsilon$ from the route 310 (e.g., from route portion b). If distance $\epsilon$ is greater than a second threshold distance (e.g., a yard, a meter, two yards, two meters, five yards, five meters, and/or the like), an updated sequence 350' may be generated based on the location U (e.g., the determined current user location) and provided to the user (e.g., via the sound device(s) 27), as shown in FIGS. 4B and 4C. For example, the distance aspects b', c', d', and e' between location U and the corresponding waypoints and/or location of the route 310 are determined and the directional aspects β, γ, δ, and ε between the reference heading 320 and the straight line between the location U and the corresponding waypoint and/or location of the route 310 are determined. As should be understood, the distances between the consecutive waypoints and/or locations of the route 310 have not changed, and thus the cadence need not be re-determined, in an example embodiment. The updated route sequence 350' may then be determined and/or generated based on the distance aspects and directional aspects determined based on the location U. For example, the volume at which each of the pitches and/or notes 355' of the updated route sequence 350' is provided may be determined based on the corresponding distance aspect. For example, the direction from which each of the pitches and/or notes 355' of the updated route sequence 350' is determined based on the corresponding directional aspect. In an example embodiment, the updated route sequence 350' comprises a note and/or pitch 355' corresponding to the location U. In an example embodiment, the updated route sequence 350' does not comprise a note and/or pitch 355 corresponding to location U. The updated route sequence 350' may then be audibly provided to the user via the sound device(s) 27.

Similarly, a second threshold angle may be defined. If a user heading is not within the second threshold angle of the expected user heading (e.g., as determined based on the direction the user is expected to be facing and/or moving in when traveling from the immediately preceding waypoint and/or location of the route 310 to the immediately next waypoint and/or location of the route 310), the second threshold requirement may be satisfied and an updated route sequence 350' may be provided to realign the user with the route 310. In an example embodiment, the second threshold requirement is only met if the user heading is not within the second threshold angle of the expected user heading for a minimum number of consecutive determinations of the user location and/or heading. For example, if for three consecutive determinations of the user location and/or heading, for example, the user heading is not within the second threshold angle of the expected user heading based on the route 310, an updated route sequence 350' may be determined/generated and provided. However, if the user heading is not within the second threshold angle of the expected user heading based on the route 310 for only one or two consecutive determinations of the user location and/or heading, for example, an updated route sequence 350' may not be determined/generated and provided, as the user is likely just looking at something within the space.

FIGS. 5A, 5B, and 5C illustrate an example of when a first threshold requirement is satisfied and an updated route sequence 350' is determined/generated and provided. For example, FIGS. 5A and 5B show the space 300 at some time t' when the user has traveled from location A to waypoint B (and/or within a first threshold distance of waypoint B). For example, the user apparatus 20 may monitor the user location and/or heading and determine at time t' that the user location is at the waypoint B and/or within a first threshold distance of the waypoint B and the reference heading (e.g., the user heading) 320 is as shown in in FIG. 5B. Responsive to determining that the user location is waypoint B and/or within a first threshold distance of waypoint B, an updated sequence 350' may be generated based on the user being located at waypoint B and provided to the user (e.g., via the sound device(s) 27), as shown in FIG. 5C. For example, the distance aspects c', d', and e' between waypoint B and the corresponding waypoints and/or location of the route 310 are determined and the directional aspects γ, δ, and ε between the reference heading 320 and the straight line between the waypoint B and the corresponding waypoint and/or location of the route 310 are determined. As should be understood, the distances between the consecutive waypoints and/or locations of the route 310 have not changed, and thus the cadence need not be re-determined, in an example embodiment. The updated route sequence 350' may then be determined and/or generated based on the distance aspects and directional aspects determined based on the user location being at waypoint B. For example, the volume at which each of the pitches and/or notes 355' of the updated route sequence 350' is provided may be determined based on the corresponding distance aspect. For example, the direction from which each of the pitches and/or notes 355' of the updated route sequence 350' is determined based on the corresponding directional aspect. In an example embodiment, the updated route sequence 350' comprises a note and/or pitch 355' corresponding to the waypoint B that is provided at the maximum volume of the sequence and/or that is an omnidirectional sound. The updated route sequence 350' may then be audibly provided to the user via the sound device(s) 27.

In various embodiments, a route 310 may comprise a large number of waypoints. For example, a long or complex route may comprise fifteen waypoints (e.g., origin location A, waypoints B-N, and destination location O), for example. In an example embodiment, the maximum number may be twelve. For example, only twelve unique frequencies, notes, and/or pitches may be defined for assignment to the waypoints and/or locations of the route. In such an embodiment, a route sequence 350 may be provided with notes and/or pitches representing the first twelve waypoints and/or locations of the route (e.g., the origin location A and waypoints B-K). Once the user reaches waypoint B, the updated route sequence may recycle the frequency, note and/or pitch that was assigned to location A for waypoint L (and/or the set of frequencies, notes, and/or pitches may be shifted such that the frequency, note, and/or pitch previously assigned to location A is now assigned to waypoint B) and the updated route sequence comprises notes and/or pitches representing waypoints B-L. Once the user reaches waypoint C, the updated route sequence may recycle the frequency, note and/or pitch that was assigned to location B for waypoint M (and/or the set of frequencies, notes, and/or pitches may be shifted such that the frequency, note, and/or pitch previously assigned to waypoint B is now assigned to waypoint C) and the updated route sequence comprises notes and/or pitches representing waypoints C-M. Such updating and recycling may continue until the updated route sequence includes the destination location O, which point there is no need to recycle any of the frequencies, notes, and/or pitches. In an example embodiment, the route sequence 350 always includes a note and/or pitch for the destination location. For example, returning to the above example, the route sequence may comprise notes and/or pitches for the origin location A, waypoints B-J, and destination location O. Once the user reaches waypoint B, the route sequence may be updated to comprise notes and/or pitches for waypoints B-K and destination location O, and so on.

Providing a Route Sequence

FIG. 6 provides a flowchart illustrating processes, procedures, and/or operations for providing route guidance using harmonic and/or audible route sequences, according to an example embodiment. Starting at block 602, an indication of a destination is received. For example, the user apparatus 20 may receive an indication of a destination. For example, the user apparatus may comprise means, such as processor 22, memory 24, communication interface 26, user interface 28, and/or the like, for receiving an indication of a destination. For example, a user may provide user input entering and/or selecting a destination. In an example embodiment, the indication of the destination may be provided by a location (e.g., geolocation, address, seat location, and/or the like) or by identifying a POI (e.g., store name, stage name, vendor name, and/or the like). In an example embodiment, the indication of the destination is received via an interactive user interface provided via the user apparatus 20. In an example embodiment, the destination is located within a space. For example, with reference to FIG. 3A, an indication of the destination location E may be received.

Continuing with FIG. 6, at block 604, a user location and/or heading is determined. For example, the user apparatus 20 may determine a user location and/or heading. For example, the user apparatus 20 may comprise means, such as processor 22, memory 24, sensors 29, and/or the like, for determining the user location and/or heading. In an example embodiment, the user location may be within and/or within the vicinity of the space. In various embodiments, the user location may be determined via outdoor positioning techniques or indoor positioning techniques as appropriate for the space. For example, with reference to FIG. 3A, the location A and reference heading (e.g., the user heading) 320 may be determined.

Returning to FIG. 6, at block 606, a route from the user location to the destination is determined. For example, the user apparatus 20 may determine a route from the user location to the destination. For example, the user apparatus 20 may comprise means, such as processor 22, memory 24 storing a digital map representing the space, and/or the like, for determining a route from the user location to the destination. In various embodiments, the route is determined by identifying one or more waypoints and defining route portions between the waypoints to provide a route from the user location to the destination. For example, the route one or more waypoints and/or route may be identified and/or determined to provide a route of shortest distance, shortest expected traversal time, and/or the like that avoids obstacles within the space. As should be understood, the route is determined based on the digital map of the space. For example, as shown in FIG. 3A, waypoints B, C, and D defining route portions b, c, d, and e of route 310 from the origin location A to the destination location E are determined.

Continuing with FIG. 6, at block 608, the distance aspects for each of the waypoints is determined. For example, the user apparatus 20 may determine the distance aspects for each of the waypoints. For example, the user apparatus 20 may comprise means, such as the processor 22, memory 24, and/or the like, for determining the distance aspects for each of the waypoints. In an example embodiment, a distance aspect for a waypoint is the distance between the user location and the waypoint. For example, the distance aspect of a waypoint may be the Euclidean and/or straight line distance between the waypoint and the user location (e.g., without consideration of any obstacles between the waypoint and the user location). In an example embodiment, a distance aspect may also be determined (e.g., by the user apparatus 20) for the destination location. In an example embodiment, the distance aspects for each of the waypoints is determined as an absolute distance. In an example embodiment, the distance aspects for each of the waypoints is determined relative to the distances between the other waypoints and the user location (e.g., as a ratio and/or the like). For example, as shown in FIG. 3B, distance aspects b', c', d', and e' indicating the distances from waypoints B, C, and D and destination location E to the user location at location A may be determined.

Returning to FIG. 6, at block 610, the directional aspects for each of the waypoints is determined. For example, the user apparatus 20 may determine the directional aspects for each of the waypoints. For example, the user apparatus 20 may comprise means, such as the processor 22, memory 24, and/or the like, for determining the directional aspects for each of the waypoints. In an example embodiment, a directional aspect for a waypoint is the angle between the reference heading 320 (e.g., user heading) and a straight line drawn between the waypoint and the user location. In an example embodiment, the directional aspect may be positive or negative to indicate whether the direction of the waypoint is to the left or right of the reference heading. In an example embodiment, a directional aspect may also be determined (e.g., by the user apparatus 20) for the destination location. For example, as shown in FIG. 3B, the directional aspects β, γ, δ, and ε are determined as the angles between the reference heading 320 and a straight line between the corresponding waypoint and/or location of route 310 and location A.

Continuing with FIG. 6, at block 612, the route sequence is determined. For example, the user apparatus 20 may determine the route sequence. For example, the user apparatus 20 may comprise means such as the processor 22, memory 24, and/or the like for determining a route sequence. For example, a note and/or pitch may be assigned to each waypoint of the route. The volume and/or direction for each note and/or pitch may then be determined. A cadence of the route sequence may be determined in an example embodiment. For example, FIGS. 3C and 3D illustrate the assignment of a note and/or pitch 355 to each waypoint and/or location of the route 310, determination of a volume and direction of each note and/or pitch 355 of the route sequence 350, and determination of a cadence of the route sequence 350.

The volume at which a first note and/or pitch corresponding to a first waypoint is provided is determined based on the distance aspect corresponding to the first waypoint. For example, a relative distance aspect may be determined for each waypoint indicating the relative distance from the user location (e.g., location A) to the corresponding waypoint (and/or destination at location E). Based on the relative distances and the volume scale for the route sequence (as defined by the maximum volume and the minimum volume), the volume of each note and/or pitch may be determined such that a volume at which a first note and/or pitch corresponding to a first waypoint is provided is louder than a volume which a second note and/or pitch corresponding to a second waypoint is provided when the first distance aspect corresponding to the first waypoint and the second distance aspect corresponding to the second waypoint indicate that the first waypoint is closer to the user location than the second waypoint. For example, the volume of a pitch may be proportional to the relative distance between the corresponding waypoint and the user location (e.g., relative with respect to the distance between the other waypoints and the user location). In an example embodiment, the note and/or pitch corresponding to the user location may be provided at the maximum volume of the route sequence.

In an example embodiment, a direction from which each note and/or pitch is to be provided is determined based on the directional aspect of the corresponding waypoint. For example, if the directional aspect of a first waypoint indicates that the first waypoint is located 20° to the user's right, with respect to the reference heading, the note and/or pitch corresponding to the first waypoint may be provided such that the noise seems, to the user, to be coming from 20° to the user's right, with respect to the reference heading. In an example embodiment, the note and/or pitch corresponding to the user location may be provided as an omnidirectional noise such that the noise seems, to the user, to be being generated in 360° around the user.

In an example embodiment, the cadence is determined based on the lengths of the route portions. For example, the notes and/or pitches of the route sequence may be ordered based on the order through which the user will pass through the corresponding waypoints to reach the destination. The temporal distance between when two consecutive notes and/or pitches are provided and/or the rhythm with which the notes and/or pitches are provided is referred to herein as the cadence of the route sequence. In an example embodiment, the temporal distance between two consecutive notes and/or pitches corresponds to the physical distance between the corresponding two consecutive waypoints. For example, if the route portion between a first waypoint and a second waypoint is shorter than the route portion between the second waypoint and a third waypoint, the temporal distance between a first note and/or pitch corresponding to the first waypoint and a second note and/or pitch corresponding to the second waypoint in the route sequence is shorter than the temporal distance between the second note and/or pitch and a third note and/or pitch corresponding to the third waypoint in the route sequence. The temporal distance may be a quiet time in the route sequence (e.g., a lack of a note and/or pitch) or may be an extended length of a note and/or pitch (e.g., whether a note and/or pitch is provided as an eighth note, quarter note, half note, whole note, and/or the like in the route sequence).

Continuing with FIG. 6, at block 614, an audible rendering of the route sequence is provided to the user. For example, the user apparatus 20 may audibly provide the route sequence to the user. For example, the user apparatus 20 comprises means, such as processor 22, memory 24, user interface 28, sound device(s) 27, and/or the like for audibly providing the route sequence to the user. For example, the route sequence may be audibly provided to the user via the sound device(s) 27. In various embodiments, the route sequence may be provided as part of audio stream already being provided to the user. For example, the user apparatus 20 may be providing the user with a music stream, podcast, and/or the like via the sound device(s) 27 and the route sequence may be incorporated into the audio stream. In another example embodiment, the audio stream may be reduced in volume level and the route sequence may be provided over the audio stream. For example, the volume level of the audio stream may be reduced and the route sequence may be provided at the volume setting of the user apparatus 20 and/or sound device(s) 27 (e.g., the volume level that the audio stream was being provided at before the volume level of the audio stream was reduced). In an example embodiment, the audio stream is paused, the route sequence is provided, and then play of the audio stream continues.

At block 616, the user location and/or heading is monitored and when a route sequence update is triggered, an updated route sequence is determined and/or generated and the updated route sequence is audibly provided to the user. For example, the user apparatus 20 may periodically determine the user location and/or heading, determine if a route sequence update is triggered, and responsive to a route sequence update being triggered, determine an updated route sequence and provide the updated route sequence to the user. For example, the user apparatus 20 may comprise means such as processor 22, memory 24, user interface 28, sound device(s) 27, sensor(s) 29, and/or the like for determining the user location and/or heading, determining if a route sequence update is triggered, and responsive to a route sequence update being triggered, determining an updated route sequence and providing the updated route sequence to the user. For example, if a predetermined period of time has elapsed since the route sequence or an updated route sequence was last provided, a route sequence update may be triggered, in an example embodiment. In an example embodiment, a route sequence update may be triggered in response to receiving user input (e.g., via the user interface 28) indicating that the user would like an updated route sequence to be provided. In an example embodiment, a route sequence update may be triggered in response to determining that a first threshold requirement is satisfied. For example, the first threshold requirement may be satisfied when the user location is at a waypoint and/or within a first threshold distance of the waypoint. In an example embodiment, a route sequence update may be triggered in response to determining that a second threshold requirement is satisfied. For example, the second threshold requirement may be satisfied when the user location is more than a second threshold distance from the route. For example, the second threshold requirement may be satisfied when the user heading is not within a second threshold angle of an expected user heading (e.g., given the user location and the route). In another example, the second threshold requirement may be satisfied when the user heading is not within a second threshold angle of an expected user heading (e.g., given the user location and the route) for a predetermined number of determinations of the user location and/or heading. In various embodiments, the route sequence is updated based on the distance and/or directional aspects determined based on the current user location, current reference heading, and/or the like to determine and/or generate the updated route sequence. The updated route sequence may then be audibly provided to the user (e.g., via the sound device(s) 27).

At block 618, it is determined that the periodically determined user location indicates that the user has reached the destination. For example, the user apparatus 20 may determine that the location of the user indicates the user has reached the destination. For example, the user apparatus 20 may comprise means, such as the processor 22, memory 24, sensor(s) 29, and/or the like for determining that the user location indicates that the user has reached the destination. For example, the user location may be within the first threshold distance of the destination location. Responsive to determining that the user has reached the destination, the process may stop. For example, responsive to determining that the user has reached the destination, the monitoring of the user location and/or heading to determine if a route sequence update has been triggered is ceased.

Triggering of and Providing of an Updated Route Sequence

FIG. 7 provides a flowchart illustrating processes, procedures, and/or operations for monitoring a location and/or heading of a user to determine if a route sequence update is triggered and, responsive to determining that a route sequence update has been triggered, determining an updated route sequence and providing the updated route sequence, in accordance with an example embodiment. Starting at block 702, a user location and/or heading may be determined. For example, the user apparatus 20 may periodically (e.g., every second, every five, ten, twenty, thirty, or forty-five seconds, every minute, and/or the like) determine the user location and/or the heading. For example, the user apparatus 20 may comprise means, such as the processor 22, memory 24, sensor(s) 29, and/or the like, for periodically determining the user location and/or heading. In various embodiments, the user location and/or heading may be determined using indoor and/or outdoor location determining techniques, as appropriate for the space.

At block 704, it is determined a first threshold requirement is satisfied. For example, the apparatus 20 may determine if a first threshold requirement is satisfied. For example, the user apparatus 20 may comprise means, such as processor 22, memory 24, and/or the like, for determining if a first threshold requirement is satisfied. In an example, embodiment, a first threshold requirement is satisfied when the user location is at a waypoint of the route and/or within a first threshold distance (e.g., a foot, a yard, a meter, and/or the like) of a waypoint of the route, as illustrated in FIG. 5A. For example, the first threshold requirement may correspond to the user reaching a milestone (e.g., getting to a waypoint) of the route. If it is determined that the first threshold requirement is satisfied, the process continues to block 712. If it is determined that the first threshold requirement is not satisfied, the process continues to block 706.

At block 706, it is determined if a second threshold requirement is satisfied. For example, the apparatus 20 may determine if a second threshold requirement is satisfied. For example, the user apparatus 20 may comprise means, such as processor 22, memory 24, and/or the like, for determining if a second threshold requirement is satisfied. In an example embodiment, a second threshold requirement is satisfied when the user location is more than a second threshold distance (e.g., a yard, a meter, two yards, two meters, five yards, five meters, and/or the like) from the route, as shown, for example, in FIG. 4A. In an example embodiment, a second threshold requirement is satisfied when the user heading is not within the second threshold angle (e.g., five degrees, ten degrees, fifteen degrees, twenty degrees, twenty-five degrees, thirty degrees, and/or the like) of the expected user heading (e.g., as determined based on the direction the user is expected to be facing and moving in when traveling from the immediately preceding waypoint and/or location of the route to the immediately next waypoint and/or location of the route. In an example embodiment, the second threshold requirement is satisfied if the user heading is not within the second threshold angle of the expected user heading for a minimum number (e.g., three, five, eight, ten, fifteen, twenty, thirty, and/or the like) of consecutive determinations of the user location and/or heading. For example, in an example embodiment, if for three consecutive determinations (e.g., when the minimum number is three) of the user location and/or heading, the user heading is not within the second threshold angle of the expected user heading based on the route, the second threshold requirement is satisfied. However, in the same example embodiment, if the user heading is not within the second threshold angle of the expected user heading based on the route for only one or two consecutive determinations of the user location and/or heading, the second threshold requirement is not satisfied, as the user is likely just looking at something within the space. For example, the second threshold requirement may be correspond to the user being off the route and possibly needing guidance to get back to the route. If it is determined that the second threshold requirement is satisfied, the process continues to block 712. If it is determined that the second threshold requirement is not satisfied, the process continues to block 708.

At block 708, it is determined if user input triggering a route sequence update has been received. For example, the user may be select a "play route sequence" selectable icon on a display of the user interface 28, provide audible input via a microphone of the user interface 28 requesting the route sequence be played, and/or the like. For example, the user apparatus may determine if user input requesting provision of the route sequence has been received. For example, the user apparatus may comprise means, such as the processor 22, memory 24, user interface 28, and/or the like, for determining if user input requesting provision of the route sequence has been received. If it is determined that user input requesting provision of the route sequence was received thereby triggering a route sequence update, the process continues to block 712. If it is determined that user input requesting provision of the route sequence was not received, the process continues to block 710.

At block 710, it determined if a predetermined time period has elapsed since the route sequence or updated route sequence as last provided. For example, the predetermined time period may be a preset time (e.g., every 30 seconds, every minute, every two minutes, and/or the like), a time set based on user input/preferences, based on average expected time for a user to traverse the distance between consecutive waypoints and/or locations of the route, based on the expected time for a user to traverse the distance between a first waypoint/location and a consecutive, succeeding waypoint and/or location of the route, and/or the like. For example, the user apparatus 20 may determine if a predetermined time period has elapsed since the route sequence or updated route sequence was last provided. For example, the user apparatus 20 may comprise means, such as the processor 22, memory 24, and/or the like, for determining if a predetermined time period has elapsed since the route sequence or updated route sequence was last provided. If it is determined that the predetermined time period has elapsed since route sequence or updated route sequence was last provided, the process continues to block 712. If it is determined that the predetermined time period has not elapsed since route sequence or updated route sequence was last provided, the process returns to block 702.

At block 712, the distance aspect for each of the remaining waypoints is determined. For example, the remaining waypoints are any waypoints that the user has not yet passed through (e.g., which may include a waypoint at which the user is currently located at). For example, the remaining waypoints in the scenario shown in FIG. 5A include waypoints B, C, and D and location E. For example, the user apparatus 20 may determine the distance aspects for each of the remaining waypoints. For example, the user apparatus 20 may comprise means, such as the processor 22, memory 24, and/or the like, for determining the distance aspects for each of the remaining waypoints. In an example embodiment, a distance aspect for a waypoint is the distance between the user location and the waypoint. For example, the distance aspect of a waypoint may be the Euclidean and/or straight line distance between the waypoint and the user location (e.g., without consideration of any obstacles between the waypoint and the user location). In an example embodiment, a distance aspect may also be determined (e.g., by the user apparatus 20) for the destination location. In an example embodiment, the distance aspects for each of the waypoints is determined as an absolute distance. In an example embodiment, the distance aspects for each of the waypoints is determined relative to the distances between the other waypoints and the user location (e.g., as a ratio and/or the like). For example, as shown in FIG. 5B, distance aspects c', d', and e' indicating the distances from waypoints C and D and destination location E to the user location at waypoint B may be determined. As the user is located at waypoint B, the distance aspect for waypoint B is zero.

Continuing with FIG. 7, at block 714, the directional aspects for each of the remaining waypoints is determined. For example, the user apparatus 20 may determine the directional aspects for each of the remaining waypoints. For example, the user apparatus 20 may comprise means, such as the processor 22, memory 24, and/or the like, for determining the directional aspects for each of the remaining waypoints. In an example embodiment, a directional aspect for a waypoint is the angle between the reference heading 320 (e.g., user heading) and a straight line drawn between the waypoint and the user location. In an example embodiment, the directional aspect may be positive or negative to indicate whether the direction of the waypoint is to the left or right of the reference heading. In an example embodiment, a directional aspect may also be determined (e.g., by the user apparatus 20) for the destination location. For example, FIGS. 4A and 5B illustrate determining the directional aspects for each of the remaining waypoints.

Returning to FIG. 7, at block 716, the updated route sequence is determined. For example, the user apparatus 20 may determine the updated route sequence. For example, the user apparatus 20 may comprise means such as the processor 22, memory 24, and/or the like for determining an updated route sequence. As noted above, a note and/or pitch may have been assigned to each waypoint of the route and a cadence of the route sequence may have been determined. The volume and/or direction for each note and/or pitch may then be determined. For example, FIGS. 4B, 4C, and 5C illustrate the determination of a volume and direction of each note and/or pitch 355' of the updated route sequence 350'.

For example, the volume at which a first note and/or pitch corresponding to a first waypoint is provided in the updated route sequence is determined based on the distance aspect corresponding to the first waypoint. For example, a relative distance aspect may be determined for each waypoint indicating the relative distance from the user location (e.g., location U, waypoint B, and/or the like) to the corresponding waypoint (and/or destination at location E). Based on the relative distances and the volume scale for the route sequence (as defined by the maximum volume and the minimum volume), the volume of each note and/or pitch may be determined such that a volume at which a first note and/or pitch corresponding to a first waypoint is provided is louder than a volume at which a second note and/or pitch corresponding to a second waypoint is provided when the first distance aspect corresponding to the first waypoint and the second distance aspect corresponding to the second waypoint indicate that the first waypoint is closer to the user location than the second waypoint. In an example embodiment, the note and/or pitch corresponding to the user location may be provided at the maximum volume of the route sequence.

In an example embodiment, a direction from which each note and/or pitch is to be provided in the updated route sequence is determined based on the directional aspect of the corresponding waypoint. For example, if the directional aspect of a first waypoint indicates that the first waypoint is located 20° to the user's right, with respect to the reference heading (e.g., the user heading), the note and/or pitch corresponding to the first waypoint may be provided such that the noise seems, to the user, to be coming from and/or generated at a location 20° to the user's right, with respect to the reference heading. In an example embodiment, the note and/or pitch corresponding to the user location may be provided as an omnidirectional noise such that the noise seems, to the user, to be being generated in 360° around the user.

At block 718, an audible rendering of the updated route sequence is provided to the user. For example, the user apparatus 20 may audibly provide the updated route sequence to the user. For example, the user apparatus 20 comprises means, such as processor 22, memory 24, user interface 28, sound device(s) 27, and/or the like for audibly providing the updated route sequence to the user. For example, the updated route sequence may be audibly provided to the user via the sound device(s) 27. In various embodiments, the updated route sequence may be provided as part of audio stream already being provided to the user. For example, the user apparatus 20 may be providing the user with a music stream, podcast, and/or the like via the sound device(s) 27 and the updated route sequence may be incorporated into the audio stream. In another example embodiment, the audio stream may be reduced in volume level and the updated route sequence may be provided over the audio stream. For example, the volume level of the audio stream may be reduced and the updated route sequence may be provided at the volume setting of the user apparatus 20 and/or sound device(s) 27 (e.g., the volume level that the audio stream was being provided at before the volume level of the audio stream was reduced). In an example embodiment, the audio stream is paused, the updated route sequence is provided, and then play of the audio stream continues. In an example embodiment, whether the updated route request is incorporated into the audio stream, the audio stream is reduced in volume level, or the audio stream is paused, depends on how the provision of the updated route sequence was triggered and/or user preferences. For example, if the provision of the updated route sequence was triggered in response to the second threshold requirement being satisfied, the audio stream may be reduced in volume level or paused whereas if the provision of the updated route sequence was triggered in response to the first threshold requirement being satisfied, the updated route sequence may be incorporated into the audio stream.

As described herein, the user apparatus 20 the processes, procedures, and/or operations of shown in figures Technical Advantages Various embodiments of the present invention provide methods, apparatuses, systems, computer program products, and/or the like for providing audible navigation guidance. For example, various embodiments provide a user with highly precise 3D spatialized auditory cues to guide a user from an origin/starting location to a destination location. Moreover, these auditory cues are independent of language and therefore may be used by intuitively used by users regardless of languages spoken by and/or understood by the user. Moreover, various embodiments of the present invention may be used to provide navigation guidance to users who are blind or seeing-impaired. Similarly, a user may be provided with navigation guidance without having to take their eyes off of the road or where they are going. The audible navigation guidance is also amenable to hands-free operation. For example, a user riding a bicycle can keep their eyes on the bike path in from of them, keep their hands on the handle bars, and still receive navigation guidance via the audible navigation guidance of various embodiments. Additionally, various embodiments do not merely provide the user with a next direction/instruction, but provide the user with an overview of the route as a whole (and/or a significant portion of the route if the route is particularly long and/or complex).

Additionally, various embodiments of the present invention provide a user with an audible perception of the overall route. For example, the audible perception of the overall route enables the user to gain understanding about the space (e.g., venue, geography, indoor, and/or outdoor space) beyond the line-of-sight. For example, a user may be provide with orientation and location-based information about an area that the user cannot see. Moreover, various embodiments provide the user with a perception of an overall route that does not require a user to look at a mobile device (e.g., take their eyes off of the road or path they are traveling along to view a mobile phone or navigation device or use their hands to access a map via the mobile phone or navigation device). Thus, various embodiments provide a user with a technical tool for orienting themselves in a space and receiving route guidance within the space that allows the user to move through the space along the route in a hands-free manner that does not require the user to view a screen.

Thus, various embodiments of the present invention provide a technical solution to the technical problem of providing audible navigation guidance. In various embodiments, the technical solution comprises determining/generating and providing a route sequence (and/or updated route sequence(s)) to a user via one or more sounds devices based on distance aspects and/or directional aspects of waypoints of a corresponding route. For example, various embodiments provide an aural representation of a route that is independent of language and may be incorporated into an audio stream, if a user so desires. As such, various embodiments provide a more user accessible technical solution to the technical problem of providing navigational guidance than traditional aural navigational guidance techniques that include the use of words and sentences.

III. Example Apparatus

The user apparatus 20 and/or map apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a smart watch or other wearable computing entity/device, a camera, a computer, tablet, laptop, mobile computing entity/device, and/or other device that can perform navigation-related functions, such as digital routing, audible route sequence generation and/or provision, and/or the like. Additionally or alternatively, the user apparatus 20 and/or map apparatus 10 may be embodied in other types of computing devices, such as a server, a personal computer, a computer workstation, a laptop computer, a plurality of networked computing devices or the like, that are configured to generate map information/data of a digital map (e.g., geographic database) representing the spatial layout and/or topology of a space (e.g., an indoor space and/or outdoor space), update and/or maintain the map information/data of the digital map, provide map information/data of the digital map, and/or the like. In an example embodiment, a user apparatus 20 is an in-vehicle navigation system onboard a vehicle or a mobile device such as a smart phone or smart wearable device (e.g., watch, heads-up display, and/or the like); a map apparatus 10 is a server; and/or the like. In this regard, FIG. 2A depicts an example map apparatus 10 and FIG. 2B depicts an example user apparatus 20 that may be embodied by various computing devices including those identified above. As shown, the map apparatus 10 of an example embodiment may include, may be associated with, or may otherwise be in communication with a processor 12 and a memory device 14 and optionally a communication interface 16 and/or a user interface 18. Similarly, a user apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor; IMU sensors; camera(s); indoor location determination sensors such as an iBeacons receiver/transmitter, RFID receiver/transmitter, and/or the like); and/or other components configured to perform various operations, procedures, functions, or the like described herein. In an example embodiment, a user interface 28 coupled to, comprises, and/or is in communication with one or more sound devices 27. In an example embodiment, the one or more sounds devices 27 comprises a personal sound device such as, for example, a set of headphones, earbuds, hearing aids, or bone conduction devices. In various embodiments, the sound device(s) 27 is a surround sound sound output device and/or other sound output device capable of providing directional sounds.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the map apparatus 10, and/or user apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor 12, 22 may be specifically configured hardware for conducting the operations described herein. Alternatively, as another example, when the processor 12, 22 is embodied as an executor of software instructions, the instructions may specifically configure the processor to perform the algorithms and/or operations described herein when the instructions are executed. However, in some cases, the processor 12, 22 may be a processor of a specific device (e.g., a pass-through display or a mobile terminal) configured to employ an embodiment of the present invention by further configuration of the processor by instructions for performing the algorithms and/or operations described herein. The processor 12, 22 may include, among other things, a clock, an arithmetic logic unit (ALU) and logic gates configured to support operation of the processor.

In some embodiments, the map apparatus 10, and/or user apparatus 20 may include a user interface 18, 28 that may, in turn, be in communication with the processor 12, 22 to provide output to the user, such as one or more route sequences via a sound device 27, and, in some embodiments, to receive an indication of a user input (e.g., indicating a destination). As such, the user interface 18, 28 may include a display, speakers (e.g., sound device 27), and/or the like and, in some embodiments, may also include a user input device such as a keyboard, a mouse, a joystick, a touch screen, touch areas, soft keys, a microphone, or other input mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24, and/or the like).

The map apparatus 10 and/or the user apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network (e.g., network 50). Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, the map apparatus 10 and/or user apparatus 20 of an example embodiment may also include (e.g., store in memory 14, 24) or have access to a geographic database that includes a variety of data (e.g., map information/data of digital maps of one or more spaces) utilized in constructing a route or navigation path, determining the time to traverse the route or navigation path, matching a geolocation (e.g., a GNSS determined location) to a point on a map, waypoints, points of interest, and/or obstacles located within the space, and/or the like. For example, a geographic database may include a plurality of waypoint data records, obstacle data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise space data records corresponding to the space (e.g., shopping mall, stadium or arena, fairgrounds, festival, amusement park, public park, and/or other indoor/outdoor space), waypoint data records corresponding to one or more waypoints within the space, obstacle data records corresponding to one or more obstacles within the space, POI data records corresponding to one or more POIs within the space and/or in the vicinity of the space, and/or other data records. In an example embodiment, the map apparatus 10 may be configured to modify, update, and/or the like one or more data records of the geographic database. For example, the map apparatus 10 may modify, update, generate, and/or the like a digital map representing a space and/or the corresponding data records, a localization layer and/or the corresponding data records, and/or the like.

In an example embodiment, the waypoint data records store information/data corresponding to waypoints within the space. For example, a waypoint data record may store an absolute (e.g., a latitude and longitude, and/or the like) or relative location (e.g., relative to one or more iBeacons, RFID tags, and/or the like) of a waypoint, contextual information corresponding to the waypoint, a POI located at the waypoint, and/or the like. An obstacle data record may store an absolute (e.g., a latitude and longitude, and/or the like) or relative location (e.g., relative to one or more iBeacons, RFID tags, and/or the like) of an obstacle, a spatial extent and/or shape of an obstacle, a POI located at the obstacle, and/or the like. For example, waypoints may be located at walkable and/or traversable areas of the space and an obstacle may be an object or place within the space that is not walkable and/or traversable. For example, an example obstacle at a stadium may be a peanut stand. In an example embodiment, the geographic database may further store data records corresponding to roads, crosswalks, sidewalks, pedestrian paths, bike paths, and/or the like and/or intersections thereof along which one or more waypoints may be defined and one or more traversable paths may be provided.

The waypoints, obstacles, and/or POIs can be associated with attributes, such as geographic coordinates, relative locations, metadata identifying the type of waypoint, obstacle, or POI and/or other attributes of the waypoint, obstacle or POI. Waypoints and/or obstacles may also be associated with POIs, such as stores, displays, cash registers, staircases, escalators, elevators, restrooms, and/or the like. The geographic database can include information/data about the POIs and their respective locations in the POI data records. In addition, the geographic database can include and/or be associated with event data (e.g., scheduled events, unscheduled events, construction, etc.) associated with the POI data records or other records of the geographic database. For example, if the space is a festival, the POI data records or other data records of the geographical database may comprise information/data corresponding to scheduled events of the festival.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities (e.g., shopping mall, arena, stadium, amusement park, and/or other space owners/managers; festival or fair organizers; and/or the like). In addition, the map developer can employ field personnel to travel by throughout the space to observe features and/or record information about the space, for example. Also, remote sensing, such as aerial, satellite, or drone-based photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other navigation-related functions. The navigation-related functions can correspond to vehicle navigation, pedestrian navigation, cyclist navigation, and/or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a map apparatus 10, and/or user apparatus 20 in accordance with an example embodiment may determine a route, one or more way points of a route, the time to traverse a route, and/or the like.

IV. Apparatus, Methods, and Computer Program Products

As described above, FIGS. 6 and 7 illustrate flowcharts of a user apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    determining, by a user apparatus and via one or more location sensors, a user location;
    determining, by the user apparatus, a distance aspect for one or more waypoints, wherein (a) the one or more waypoints are identified based on map data of a geographic database, (b) the one or more waypoints define at least part of a route to a destination location, and (c) the distance aspect of a first waypoint is a distance between the first waypoint and the user location;
    determining, by the user apparatus, a directional aspect for one or more waypoints, wherein the directional aspect of a first waypoint is an angle between a line connecting the user location to the first waypoint and a reference heading;
    determining, by the user apparatus, a cadence based on distances between consecutive waypoints of the route;

determining, by the user apparatus, a route sequence based on the distance aspects for the one or more waypoints, the directional aspects for the one or more waypoints, and the cadence, wherein (a) each waypoint is assigned an audible pitch, (b) a volume assigned to the audible pitch for the first waypoint is determined based on the distance aspect corresponding to the first waypoint, (c) a direction assigned to the audible pitch for the first waypoint is determined based on the directional aspect corresponding to the first waypoint; and causing, by the user apparatus, the route sequence to be audibly provided via a sound device.

2. The method of claim 1, further comprising:
receiving, by the user apparatus, an indication of the destination location;
identifying the one or more waypoints between the user location and the destination location; and
determining the route from the user location to the destination location based on the identified one or more waypoints.

3. The method of claim 1, wherein the route sequence comprises an audible pitch for each waypoint of the route between the user location and the destination location.

4. The method of claim 1, wherein the route sequence comprises an audible pitch for up to the next twelve waypoints of the route between the user location and the destination location.

5. The method of claim 1, wherein (a) the user location is within a space, (b) the destination location is within the space, and (c) the geographic database comprises map data providing a digital representation of the space.

6. The method of claim 1, further comprising:
determining a user heading via the one or more location sensors, wherein the reference heading is the user heading.

7. The method of claim 1, wherein the audible pitches assigned to the one or more waypoints comprise at least a portion of a musical scale.

8. The method of claim 1, wherein the sound device is a set of headphones, earbuds, hearing aids, or bone conduction devices.

9. The method of claim 1, wherein the volume and direction assigned to the audible pitch corresponding to the first waypoint are configured to make the audible pitch sound as if it was generated at the first waypoint.

10. The method of claim 1, wherein the route sequence is determined responsive to at least one of (a) determining the route to the destination, (b) a predetermined time period elapsing since the route sequence was last provided, (c) the user location being within a first threshold distance of one of the one or more waypoints, (d) the user location being more than a second threshold distance from the route, or (e) a user heading being more than a second threshold angle from an expected user heading determined based on the route and the user location.

11. The method of claim 1, wherein when the user location is within a first threshold distance of a first waypoint of the one or more waypoints, the directional aspect corresponding to the first waypoint is omnidirectional.

12. An apparatus comprising:
at least one processor;
at least one memory storing (a) program code and (b) a geographic database comprising map data;
one or more location sensors; and
a user interface configured to operate one or more sound devices, wherein the at least one memory and the program code are configured to, with the processor, cause the apparatus to at least:
determine, via the one or more location sensors, a user location;
determine a distance aspect for one or more waypoints, wherein (a) the one or more waypoints are identified based on the map data of the geographic database, (b) the one or more waypoints define at least part of a route to a destination location, and (c) the distance aspect of a first waypoint is a distance between the first waypoint and the user location;
determine a directional aspect for one or more waypoints, wherein the directional aspect of a first waypoint is an angle between a line connecting the user location to the first waypoint and a reference heading;
determine a cadence based on distances between consecutive waypoints of the route;
determine a route sequence based on the distance aspects for the one or more waypoints, the directional aspects for the one or more waypoints, and the cadence, wherein (a) each waypoint is assigned an audible pitch, (b) a volume assigned to the audible pitch for the first waypoint is determined based on the distance aspect corresponding to the first waypoint, (c) a direction assigned to the audible pitch for the first waypoint is determined based on the directional aspect corresponding to the first waypoint; and
cause, by the user interface, the route sequence to be audibly provided via at least one of the one or more sound devices.

13. The apparatus of claim 12, wherein the at least one memory and the program code are further configured to, with the processor, cause the apparatus to at least:
receive an indication of the destination location;
identify the one or more waypoints between the user location and the destination location based on the map data; and
determine the route from the user location to the destination location based on the identified one or more waypoints.

14. The apparatus of claim 12, wherein the route sequence comprises an audible pitch for each waypoint of the route between the user location and the destination location.

15. The apparatus of claim 12, wherein the route sequence comprises an audible pitch for up to the next twelve waypoints of the route between the user location and the destination location.

16. The apparatus of claim 12, wherein the at least one memory and the program code are further configured to, with the processor, cause the apparatus to at least:
determine a user heading via the one or more location sensors, wherein the reference heading is the user heading.

17. The apparatus of claim 12, wherein the audible pitches assigned to the one or more waypoints comprise at least a portion of a musical scale.

18. The apparatus of claim 12, wherein the one or more sound devices comprise at least one of headphones, earbuds, hearing aids, or bone conduction devices.

19. The apparatus of claim 12, wherein the volume and direction assigned to the audible pitch corresponding to the first waypoint are configured to make the audible pitch sound as if it was generated at the first waypoint.

20. A computer program product comprising at least one non-transitory computer-readable storage medium having computer-readable program code portions stored therein, the computer-readable program code portions comprising executable portions configured to:

- determine, via one or more location sensors, a user location;
- determine a distance aspect for one or more waypoints, wherein (a) the one or more waypoints are identified based on map data of a geographic database, (b) the one or more waypoints define at least part of a route to a destination location, and (c) the distance aspect of a first waypoint is a distance between the first waypoint and the user location;
- determine a directional aspect for one or more waypoints, wherein the directional aspect of a first waypoint is an angle between a line connecting the user location to the first waypoint and a reference heading;
- determine a cadence based on distances between consecutive waypoints of the route;
- determine a route sequence based on the distance aspects for the one or more waypoints, the directional aspects for the one or more waypoints, and the cadence, wherein (a) each waypoint is assigned an audible pitch, (b) a volume assigned to the audible pitch for the first waypoint is determined based on the distance aspect corresponding to the first waypoint, (c) a direction assigned to the audible pitch for the first waypoint is determined based on the directional aspect corresponding to the first waypoint; and
- cause the route sequence to be audibly provided via one or more sound devices.

* * * * *